United States Patent
Lawson et al.

(10) Patent No.: US 12,345,627 B2
(45) Date of Patent: Jul. 1, 2025

(54) ELECTROMAGNETIC CONTROL OF ABSORPTION AND SUPPRESSION OF SPECTRAL ARTIFACTS

(71) Applicant: Servomex Group Limited, Crowborough (GB)

(72) Inventors: Michael Lawson, Crowborough (GB); Martin Lopez, Crowborough (GB); Bahram Alizadeh, Crowborough (GB)

(73) Assignee: Servomex Group Limited, Crowborough (GB)

( * ) Notice: Subject to any disclaimer, the term of this patent is extended or adjusted under 35 U.S.C. 154(b) by 309 days.

(21) Appl. No.: 17/934,300

(22) Filed: Sep. 22, 2022

(65) Prior Publication Data

US 2023/0098004 A1    Mar. 30, 2023

(30) Foreign Application Priority Data

Sep. 24, 2021 (GB) .................................... 2113699
Aug. 4, 2022 (GB) .................................... 2211371

(51) Int. Cl.
  *G01N 21/25* (2006.01)
  *G01N 21/31* (2006.01)
  *G01N 21/3504* (2014.01)

(52) U.S. Cl.
  CPC ....... *G01N 21/255* (2013.01); *G01N 21/3103* (2013.01); *G01N 21/3504* (2013.01)

(58) Field of Classification Search
  CPC ............. G01N 21/255; G01N 21/3103; G01N 21/3504
  See application file for complete search history.

(56) References Cited

U.S. PATENT DOCUMENTS

| | | | |
|---|---|---|---|
| 2,636,926 | A | 4/1953 | Wilson, Jr. et al. |
| 4,989,975 | A | 2/1991 | Dencks et al. |
| 2004/0155664 | A1 | 8/2004 | Zhu et al. |
| 2008/0204720 | A1 | 8/2008 | Howell |
| 2017/0322147 | A1 | 11/2017 | Sugihara |
| 2019/0353594 | A1 | 11/2019 | Massey et al. |

FOREIGN PATENT DOCUMENTS

| | | | | |
|---|---|---|---|---|
| DE | 102 00 029 A1 | 8/2002 | | |
| EP | 2 927 668 A1 | 10/2015 | | |
| EP | 2 955 495 A2 | 12/2015 | | |
| EP | 3 171 159 A1 | 5/2017 | | |
| GB | 2237630 A | * | 5/1991 | ......... G01N 21/3504 |

(Continued)

OTHER PUBLICATIONS

European Examination Report dated Apr. 16, 2024 for European Application No. 22197587.3; 6 Pages.

(Continued)

*Primary Examiner* — Jamil Ahmed
(74) *Attorney, Agent, or Firm* — DALY, CROWLEY, MOFFORD & DURKEE, LLP

(57) ABSTRACT

A method and system for the suppression and/or modulation of absorption spectrum artifacts for the purpose of gas detection and concentration measurements using at least one magnetic, electric or electromagnetic field. A field applied selectively to at least one section of the system modulates absorption by influencing quantum energy state transitions of gas species.

43 Claims, 18 Drawing Sheets

(56) References Cited

FOREIGN PATENT DOCUMENTS

| GB | 2 612 906 A | 5/2023 |
|---|---|---|
| JP | S 52-156687 A | 12/1977 |
| WO | WO 2010/072270 A1 | 7/2010 |
| WO | WO 2017/072270 A1 | 5/2017 |

OTHER PUBLICATIONS

Extended European Search Report dated Feb. 17, 2023 for European Application No. 22197587.3; 9 Pages.
Great Britain Examination Report dated Apr. 12, 2023 for Great Britain Application No. GB2113699.9; 1 Page.
Response to Great Britain Official Communication dated Oct. 1, 2021 for Great Britain Application No. GB2113699.9; Response Filed Aug. 11, 2022; 14 Pages.
Great Britain Examination Report dated Aug. 16, 2022 for Great Britain Application No. GB2113699.9; 4 Pages.
Great Britain Combined Search and Examination Report dated Oct. 22, 2021 for Great Britain Application No. GB2113699.9; 10 Pages.
Response to Great Britain Combined Search and Examination Report dated Oct. 22, 2021 for Great Britain Application No. GB2113699.9; Response Filed Jul. 14, 2022; 30 Pages.
Great Britain Combined Search and Examination Report dated Sep. 23, 2021 for Great Britain Application No. GB2211371.6; 5 Pages.
Batz et al., "The Measurement of Stable Isotope Distribution Using Zeeman Atomic Absorption Spectroscopy;" Spectrochemica Acta, vol. 39B, No. 8; pp. 993-1003; Jan. 1984; 11 Pages.
Bernath, "Spectra of Atoms and Molecules;" $3^{rd}$ Edition, Chapters 6, 7, 8; Jan. 1995; 138 Pages.
Brown et al., "Electronic and Vibrational States;" Chapter 6 from *Rotational Spectroscopy of Diatomic Molecules*; Published in Jan. 2003; 125 Pages.
De Loos-Vollebregt, "Zeeman Atomic Absorption Spectroscopy;" Doctoral Thesis in Applied Sciences; May 14, 1980; Part 1 of 4; 31 Pages.
De Loos-Vollebregt, "Zeeman Atomic Absorption Spectroscopy;" Doctoral Thesis in Applied Sciences; May 14, 1980; Part 2 of 4; 24 Pages.
De Loos-Vollebregt, "Zeeman Atomic Absorption Spectroscopy;" Doctoral Thesis in Applied Sciences; May 14, 1980; Part 3 of 4; 31 Pages.
De Loos-Vollebregt, "Zeeman Atomic Absorption Spectroscopy;" Doctoral Thesis in Applied Sciences; May 14, 1980; Part 4 of 4; 20 Pages.
Galatry, "Simultaneous Effect of Doppler and Foreign Gas Broadening on Spectral Lines;" Article in Physical Review, vol. 122, No. 4; May 15, 1961; 6 Pages.
Gordon et al., "The HITRAN2016 Molecular Spectroscopic Database;" Article from Journal of Quantitative Spectroscopy & Radiative Transfer; Jan. 2017; pp. 3-69; Part 1 of 3; 24 Pages.
Gordon et al., "The HITRAN2016 Molecular Spectroscopic Database;" Article from Journal of Quantitative Spectroscopy & Radiative Transfer; Jan. 2017; pp. 3-69; Part 2 of 3; 26 Pages.
Gordon et al., "The HITRAN2016 Molecular Spectroscopic Database;" Article from Journal of Quantitative Spectroscopy & Radiative Transfer; Jan. 2017; pp. 3-69; Part 3 of 3; 17 Pages.
Koizumi, "Various Applications of Zeeman Atomic Absorption Spectroscopy;" Invited Paper Presented at $61^{st}$ Canadian Chemical Conference and Exhibition; Jun. 4, 1978; 47 Pages.
Ngo et al., "An Isolated Line-Shape Model to go Beyond the Voigt Profile in Spectroscopic Databases and Radiative Transfer Codes;" Article from Journal of Quantitative Spectroscopy & Radiative Transfer, 129; Published Jun. 6, 2013; pp. 89-100; 14 Pages.
Quack, "Angular Momentum: Understanding Spatial Aspects in Chemistry and Physics;" Book Review; Book by R.N. Zare; Angew. Chem. Int. Ed. Engl. 28, No. 7; Jan. 1989; 2 Pages.
Ramos et al., "Theory and Modeling of the Zeeman and Paschen-Back Effects in Molecular Lines;" The Astrophysical Journal, 636; Jan. 1, 2006; 16 Pages.
Rautian et al., "The Effect of Collisions on the Doppler Broadening of Spectral Lines;" Soviet Physics Uspekhi, vol. 9, No. 5; Mar.-Apr. 1967; 16 Pages.
Rothman et al., "HITEMP, the High-Temperature Molecular Spectroscopic Database;" Article from Journal of Quantitative Spectroscopy & Radiative Transfer, 111; Jan. 2010; pp. 2139-2150.
Western, "PGOPHER: A Program for Simulating Rotational, Vibrational and Electronic Spectra;" Article from Journal of Quantitative Spectroscopy & Radiative Transfer; Published Jan. 2017; Part 1 of 2; 34 Pages.
Western, "PGOPHER: A Program for Simulating Rotational, Vibrational and Electronic Spectra;" Article from Journal of Quantitative Spectroscopy & Radiative Transfer; Published Jan. 2017; Part 2 of 2; 10 Pages.
Great Britain Intention to Grant dated Dec. 13, 2023 with Allowed Claims for Great Britain Application No. GB2113699.9; 10 Pages.
Great Britain Intention to Grant dated Dec. 11, 2023 with Allowed Claims for Great Britain Application No. GB2211371.6; 10 Pages.
Great Britain Intention to Grant dated Apr. 10, 2024 with Allowed Claims for Great Britain Application No. GB2213920.8; 10 Pages.
Great Britain Combined Search and Examination Report dated Mar. 14, 2023 for Great Britain Application No. GB2213920.8; 4 Pages.
Response to European Examination Report dated Apr. 16, 2024 for European Application No. 22197587.3; Response Filed Oct. 15, 2024; 21 Pages.

* cited by examiner

ELECTROMAGNETIC CONTROL OF ABSORPTION AND SUPPRESSION OF SPECTRAL ARTIFACTS

CROSS REFERENCE TO RELATED APPLICATIONS

This patent application is entitled to claim priority from UK Patent Application Nos. 2113699.9 filed on Sep. 24, 2021 and 2211371.6 filed on Aug. 4, 2022, which are incorporated herein by reference.

FIELD OF THE INVENTION

This invention relates to absorption spectroscopy in general and to tuneable diode laser absorption spectroscopy (TDLS) and non-dispersive infrared spectroscopy in particular. The invention has applications in the detection and measurement of one or more species in a gas produced by an artificial or natural process such as an industrial, medical or physiological process.

BACKGROUND OF THE INVENTION

An example absorption measurement system consists of a source of electromagnetic radiation such as a tuneable laser source, for example a tuneable diode laser (TDL), or a broadband source such as an incandescent source or light emitting diode (LED) in combination with a wavelength range selective element, such as an optical passband filter or grating. The source emits a beam of electromagnetic radiation that is focused on to a detector, which may be a solid state photovoltaic or photoconductive detector, a pyrometer, a thermopile or bolometer. The substance that is to be analysed is positioned between the electromagnetic radiation source and the detector, so that the electromagnetic radiation incident on the detector has been modified by its path through the substance. The modifications to the electromagnetic radiation enable various parameters of the measurand gas to be determined by a signal processing system that is coupled to the detector. In some cases, the substance to be analysed is a gas produced by an industrial process and the measurand may be a parameter of one or more chemical species that are present in this process gas. References to a 'measurand gas' or 'measurand species' in this patent specification are intended to refer to a gas or gas species for which one or more parameters are to be measured or which is to be detected; the 'measurand' is the presence of a gas species or a measurable parameter of the gas species. Examples of measurand species include, but are not limited to gaseous water, $O_2$, $NO$, $NO_2$, $CO$, $CO_2$ and hydrocarbons such as methane. These measurements are often used for optimising process efficiency and for the monitoring and/or minimising of the production of pollutants and greenhouse gases. The presence and/or amount fraction (concentration) of one or more of these measurand species may be determined by absorption spectroscopy measurements using one or more TDLs. However, the conversion of observed changes in electromagnetic radiation intensities to useful physical parameters, such as concentrations and temperatures, requires a series of assumptions to be made regarding the measurand species and measurement apparatus. The term electromagnetic radiation covers a very broad wavelength range and often, but not exclusively, absorption spectroscopy measurements occur in the ultraviolet, visible and infrared regions of the electromagnetic spectrum. Illustrations within this patent will be given for the infrared light region of the electromagnetic spectrum, for obtaining absorption spectroscopy measurements corresponding to certain molecular vibrational energy transitions, but the same principles may be applied, to other relevant wavelength regions and should not be considered limited to this spectral region. For ease of expression, throughout this patent specification, the terms electromagnetic radiation or light may be used interchangeably and should be interpreted as being equally applicable to the ultraviolet, visible, infrared or other relevant range of the electromagnetic spectrum.

In operation of an example laser gas analyser system, the wavelength of the beam emitted by the TDL is scanned over a range of wavelengths including one or more absorption lines of the measurand gas species. At specific wavelengths within the range of wavelengths scanned, light is absorbed by the measurand gas, and these spectral absorption lines can be detected by measuring changes in the light flux through the substance to be analysed.

Absorption lines have characteristic "shapes" in wavelength space that are dependent on the intrinsic physical properties of the gas species (bond angles, bond lengths, number of electrons), as well as the extrinsic physical properties (velocity, temperature) and properties of the environment (pressure, composition of surroundings, etc.). The following paragraphs give an overview of mechanisms by which these shapes are produced, to give some insight about current practical limitations concerning the recovery of useful properties, such as concentration and temperature, where other perturbing factors are not, or cannot be, well-defined.

In the context above, an absorption "line" is an observable change in light transmission, which coincides with a frequency (wavelength) interval over which a photon may induce a gas molecule to transit from one quantum state to another. The probability that a photon with a particular wavelength and polarisation will elicit transition of quantum states is given by the transition's absorption cross section, $\sigma_v$ ($cm^2$/molecule). The transition dependent cross section can be coarsely estimated from first principles but can also be measured experimentally with high accuracy. Measured and calculated absorption cross-sections are catalogued in freely available spectral databases, such as HITRAN[1] and HITEMP[2].

Since the interaction of light with matter is inherently quantum in nature, the degree to which a measurand gas species with a fixed chemical identity absorbs light of a given frequency is determined not only by its number density in the measurement path, but also by its precise quantum mechanical state. This, in turn, is defined by a "quantum label" consisting of quantum numbers corresponding to eigenvalues that commute with the molecular Hamiltonian. For any given gas species, there will exist numerous quantum states with spectroscopically distinct absorption properties.

From the Heisenberg uncertainty principle, it follows that the energies of quantum states cannot be precisely defined. This uncertainty causes a smearing of the photon energies required to elicit a transition between two states, preventing spectral lines from becoming infinitely narrow. The statistical impact of different broadening mechanisms can be gathered into a frequency dependent term referred to as the "spectral line-shape" ($g_v$). The absorption cross-section of a given transition can be split into two parts: its transition intensity (S), which depends on the particulars of the quantum states that the molecule can occupy, and a spectral line-shape $g_v$, which is directly dependent on the lifetime of the transition states, as shown in equation (1).

$$\sigma_v = S g_v \qquad (1)$$

With regards to the transition intensity or "spectral line intensity", assuming there is an ensemble of molecules in thermal equilibrium, this can be calculated as shown in equation (2):

$$S_{ij} = I_a \frac{A_{ij}}{8\pi c v_{ij}^2} \frac{g' e^{-C_2 E''/T}\left(1 - e^{-C_2 v_{ij}/t}\right)}{Q(T)} \quad (2)$$

Here E" represents the energy of the state the molecule occupies prior to the transition (the lower state) and $A_{ij}$ represents the Einstein coefficient for spontaneous emission and $c_2$ is the "second radiation constant": hc/k. The partition function, Q, is calculated as shown in equation (3). Notably, equation (3) only defines the temperature dependence of a line at thermal equilibrium and the intrinsic line strength is encoded into $A_{ij}$.

$$Q(T) = \sum_k g_k e^{-\frac{c_2 E_k}{T}} \quad (3)$$

The effect of lifetime on the spectral line shape is predictable, provided that the spontaneous decay rate of the excited state, otherwise known as the Einstein $A_{21}$ coefficient, is known. In such cases, where other broadening mechanisms are absent, Γ, which represents the full-width half max (FWHM) of the transition, is equal to γ the spontaneous state decay rate (τ) according to equation (4).

$$\Gamma_{life} = \frac{1}{2\pi\tau} \quad (4)$$

Assuming γ is known, the spectral line shape, $g_v$, can be calculated using equation (5) and the line will adopt a Lorentzian profile. The natural linewidth represents a fundamental limit in measurement resolution.

$$g_v = \frac{1}{\pi} \frac{\frac{1}{2}\Gamma}{(v - v_0)^2 + \left(\frac{1}{2}\Gamma\right)^2} \quad (5)$$

As mentioned earlier, the energies of a molecule's quantum states can be perturbed by its physical environment. For example, outside of a perfect vacuum, molecules collide with other particles. These collisions, like photons, can induce changes in quantum state of the molecule, such that the natural lifetime of the original states is shortened. In gaseous states, the influence of this collisional broadening, to a great extent, resembles natural broadening and, accordingly, its influence is generally treated as a modification to the Lorentzian FWHM. However, in contrast to natural line broadening, the pressure contribution to r has a complex relationship with the pressure, temperature and chemical nature of the collisional antagonists. Pressure broadening, which is applicable to gases only, in a given set of conditions can be deduced by physically measuring the line shape and carefully subtracting other known broadening mechanisms. This is often impractical and frequently the collisional broadening is only catalogued at "Normal Temperature and Pressure" (NTP) in the absence of other gases and in air. The resultant values may then be fed into models, such as that shown in equation (6), so that linewidths corresponding to different conditions may be extrapolated.

$$\Gamma_{coll}(P, T) = (x\Gamma_{self}(P_{ref}, T_{ref}) + (1 - x)\Gamma_{air}(P_{ref}, T_{ref}))\left(\frac{P}{P_{ref}}\right)\left(\frac{T_{ref}}{T}\right)^{\gamma_{air}} \quad (6)$$

The limitations of equation (6) arise because the following assumptions are made:
- the effect of pressure in air on the broadening is linear;
- the effect of pressure can be estimated with an exponent; and
- this exponent is the same for air as well as the measurand gas species.

In mixtures containing different gases, the effective $\Gamma_s$ values need to be calculated separately. In this simple model, $\Gamma_{coll}$ would be added to $\Gamma_{life}$ and fed into equation (5) to obtain $g_v$. This result would only be applicable for low temperatures, as it does not consider the thermal contribution to broadening.

The thermal motion of a measurand gas will cause its constituent molecules to possess a range of velocities in relation to the light source. If one considers these molecules to be "observers" of incoming photons, these photons will appear red or blue shifted. At any given temperature, to conserve energy and momentum, lighter molecules will travel faster, on average, compared to those which are more massive. Therefore, thermal broadening has a positive relationship to temperature and an inverse relationship to molecular mass. The full width half maximum (FWHM) of the result Gaussian velocity distribution is shown in equation (7).

$$\Delta v_D = 2v_0 \sqrt{\frac{2kT\ln(2)}{mc^2}} \quad (7)$$

From the paragraphs above, it follows that for most practical spectroscopic applications, where temperature and pressure have an appreciable effect, the resultant transition profile is neither completely Lorentzian nor Gaussian in shape. For this reason, it is common to make use of a "Voigt" profile, which is a convolution of the Lorentzian and Gaussian line shapes (8), where x and y are dimensionless:

$$x = 2\sqrt{\ln(2)}\,\overline{(v - v_0)}/\Delta v_D \text{ and} \quad (8)$$

$$y = \sqrt{\ln(2)}\,(r_{coll} + \Gamma_{coll} + \Gamma_{life})/\Delta v_D$$

$$g_v(v - v_0) = \frac{2y\sqrt{\ln(2)}}{\pi^{3/2}\Delta v_D} \int_{-\infty}^{\infty} \frac{e^{-t^2}}{y^2 + (x - t)^2} dt$$

Whilst a Voigt profile is reasonably capable of describing a spectral line shape and suffices for most purposes, it is inadequate for high resolution measurements and numerous alternatives have been proposed[3-5]. However, the Voigt profile represents the normal standard by which line shapes are measured. In gas detection, a standard measurable quantity for a conventional spectroscopic instrument is the change in intensity of light of a given wavelength, after it has interacted with the measurand gas within a sample volume. In this illustration, the probability that a photon will be absorbed will be dependent on the absorption cross-section, shown in equation (1) and the volume density of the measurand integrated over the intersection of the light path with the measurand gas, I, commonly referred to as the pathlength or measurement path (9). Provided that the volume density, [X], remains constant over the measurement path, which will, on average, be true when the measurand gas is in thermal equilibrium with its surroundings, then u=[X]l.

$$u = \int_l [X] dl \qquad (9)$$

To calculate the proportion of light absorbed by a measurand gas in a sample volume, it is necessary to integrate the spectral overlap of all possible transitions (i) occurring at the measurement frequency, as well as all possible lines originating from any other chemical species present (j). The transmittance, which is the fraction of light which does not interact with the measurand gas over the measurement path, can then be calculated as shown in equation (10).

$$T(v) = \frac{I(v)}{I_0(v)} = e^{-\Sigma_j u^j \Sigma_i \sigma_v^{i,j}} \qquad (10)$$

The inventors of the present invention have determined that it is possible to determine, for example, changes of the volume density of a measurand gas from equation (10) in a straightforward fashion, provided the perturbing factors listed above are stable and there are no variations in incident light intensity and measurement path length. Such variations may occur, for example, during thermal flexing and mechanical vibrations of the measurement chamber. Variations in incident light intensity may be caused by a number of factors other than absorbing molecular density changes. For example, variations can be caused by intrinsic fluctuations in the laser output, changes in ambient light intensity levels and/or obscuration in the process sample stream, which may be caused by any combination of dust, tar, corrosion or optical beam misalignment. Obscuration and changing of the intensity of ambient light are to be expected in a furnace. If the variation in incident light is not corrected, this will result in a measurement uncertainty (error) in the processed measurand concentration. Various methods to compensate for these fluctuations are summarised in reference[6].

From equations (9) and (10), a further cause of measurement uncertainty can be derived, henceforth referred to as "cross-interference". This type of interference arises, at least in part, by the fact that spectroscopic measurements described above reduce the state of a 3-dimensional system to a 1-dimensional value ($T(_v)$). This means that any variations in $u^j$ or $\sigma_v^{i,j}$ over the pathlength will be averaged, so that all spatial information is completely lost. Assuming that these parameters are not constant along the measurement pathlength, which is commonly the case for in-situ gas measurements, this presents major challenges for useful signal recovery. Specifically, it means that the recovered spectrum will become the linear combination of series of different line shapes arising from one or more gases, for which the precise distribution is undefined. Where this occurs, assumptions must be made regarding, for example, the pressure, temperature and concentration along the measurement pathlength.

Let us consider oxygen monitoring across a furnace. The temperature of the furnace is typically sufficiently high that a cooling purge gas is used in the vicinity of the source and detector to prevent them from being thermally damaged. The purge gas also has the secondary function of preventing damage, for example, by particulates in the gas stream. Although compressed air can be used in such a situation as a "purge gas", and is ubiquitous and economically available compared to an oxygen free purge gas such as nitrogen, the use of compressed air is accompanied by some technical challenges. The purging air must be cooler than the gas in the furnace, which is the target volume of the measurement. According to the ideal gas law, the density of the purge gas would be significantly greater than the gas in the furnace, as would the transition strength and line profile. Any air purged volume both outside the furnace and inside the furnace, which contributes to the overall absorption path of the instrument will influence the measured oxygen reading. It is impossible to calculate the concentration of $O_2$ in the furnace without precise knowledge of the temperature distribution along the measurement path and purge gas composition and effective purge gas absorption pathlength, which may vary considerably with time depending on the source of the compressed gas. The problem is so intractable that even numerical approximations are inadequate for most applications and often measures are taken to sidestep the issue, where the absorption strength of one or more lines is carefully measured. For example, a "Hot" line might be measured, for which "S" is close to zero at the temperature of the purge gas and hence the absorption influence of its purge gas is minimal, owing to a high "E"" value for its ground state[7] (see equation (2). However, there is a measurement sensitivity cost to this choice, since such lines are invariably weaker under normal furnace operating temperatures, than lines with lower E", significantly degrading measurement performance. Furthermore, since these lines are only measurable at high temperature, major challenges are imposed on the process of calibration and/or in "start up" or cold furnace conditions. Finally, such compensation techniques are reliant on the purge gas concentration, pressure and temperature being known constants, or continuously measured—thereby limiting their utility. For a simpler solution, direct cross-interference may be eliminated entirely by purging with a non-absorbing gas such as nitrogen or argon, but whilst this approach results in the best measurement performance and improved accuracy, it is significantly more expensive and energetically wasteful, as well as being ecologically undesirable. There remains a need for energy efficient and cost-effective solutions to the problem of purge gas absorption influencing spectroscopic measurements.

A related type of interference, referred to henceforth as "Indirect Cross Interference" is readily apparent from equation (6). This interference result from the effect that the partial pressure of a foreign gas has on the line shape of a measurand gas transition. The composition of the measurement stream is seldom known with precision; if it were, the requirement for the measurement would be nullified and therefore it follows that the line shape produced by a fixed quantity of measurand gas may vary unpredictably if the partial pressures of foreign, broadening gases are not known. Direct cross interference, when caused by a foreign gas, will always result in some degree of additional indirect cross-interference. Depending on the spectroscopic technique used, this may have a significant impact on the measured transition intensity. For example, where wavelength modulation spectroscopy (WMS) is employed, the recovered line intensity is dependent on the ratio of applied amplitude modulation and transition linewidth. It follows that indirect cross interference, in this situation, necessitates a measurement technique whereby the line shape is constantly measured and used to normalise fluctuations in the transition intensity. Any uncertainty in the line shape arising from, for example, electronic noise, will be coupled into the measurement signal, to the detriment of its precision and accuracy.

Alternatively, a measurement from a secondary sensor may be used as a normative input although, once again, uncertainties still couple into the measurement and multiple sensors may be needed to achieve full coverage of interferents.

However, there is another potential cause of fluctuations in the optical detector signal, which is not due to direct fluctuations in the ambient light or laser output signal, but due to constructive and destructive optical interference occurring and causing an oscillation in the detector signal as the laser is scanned across the measurement wavelength range. The use of coherent laser light means that any reflections at any optical surfaces or interfaces along the optical path from the laser output to the detector surface (for example from surfaces/interfaces such as, but not limited to, windows, lenses and reflective interfaces) lead to the production of reflected light with a phase difference in comparison with the incident light, hence leading to optical interference, where the light rays interact. The phase relationship between this reflected light and the incident light may change with time due to such factors as temperature, vibration and pressure fluctuations, since these factors may cause physical dimensional, density or refractive index changes.

The detector is integrating this optical interference to produce an intensity signal. Since the phase difference will vary with wavelength along the measure path, the symptoms of this optical interference (or etalons) are typically the production of oscillations on the signal baseline as the laser output is scanned across the wavelength measurement range. These combine with other distortions and cause measurement inaccuracies. The signal "baseline" is the signal that would be seen even if no absorbing signal were present, in other words, the "zero absorption" signal. This baseline signal is superimposed on the actual absorption signal when present. In an ideal world, the baseline would be a straight line (flat line centred at zero in perfect circumstances), but in practice this is never achieved. The baseline may not be perfectly flat across the scan range and may have fluctuations and other distortions (or "noise"), which may be of a random or systematic nature and include the above-mentioned oscillations. These oscillations may also be referred to as "fringe" signals in the case of optical interference. These various distortion effects, of whatever origin, lead to increased uncertainty in the determination of the absorption signal or signals, and hence increased uncertainty in the derived molecular density or concentration of the measurand gas. The uncertainty is compounded where the presence of indirect cross-interference necessitates the measurement of line shape in addition to transition intensity, since the periodic etalon fringes may cause the recovered signal to broaden or narrow.

Hence, there remains a need for an absorption spectroscopy gas analyser system that minimises the influence of perturbing factors that may influence gas measurement, so that the readings are meaningful and the assumptions required to obtain a reading are minimised.

SUMMARY

This patent specification describes methods, apparatus, and systems that reduce the uncertainty of spectroscopically derived measurand gas parameters such as concentrations, which may be influenced by one or more of the following:
Optical Noise
Direct & Indirect Cross-Interference
Pathlength Variation
Pressure/Temperature Inhomogeneity A first apparatus for use in gas detection and/or measurement comprises: at least one electromagnetic radiation source for transmitting electromagnetic radiation through a gas sample towards at least one detector; at least one detector for monitoring absorption of electromagnetic radiation for at least one absorption wavelength or wavelength range associated with a gas species, by detecting transmitted electromagnetic radiation that is not absorbed; at least one field generator arranged to apply at least one of an electric, magnetic or electromagnetic field to at least one section of a transmission path of the transmitted electromagnetic radiation between the at least one source and at least one detector; and a signal processor for analysing an output signal from the at least one detector to determine the presence of and/or measure a parameter of the gas species, such as to measure concentration of particular gas species or gas species isotopomers or isotopologues.

A first method for use in gas detection and/or measurement in an absorption spectroscopy system comprises: transmitting electromagnetic radiation from at least one source of electromagnetic radiation, through a gas sample, towards at least one detector; applying at least one of an electric, magnetic or electromagnetic field to at least one section of a transmission path of the electromagnetic radiation that is transmitted between the at least one source and at least one detector; using the at least one detector to monitor absorption of electromagnetic radiation for at least one absorption wavelength or wavelength range associated with a gas species, by detecting transmitted electromagnetic radiation that is not absorbed; and analysing an output signal from the at least one detector to determine the presence of and/or measure a parameter of the gas species.

An example method includes applying at least one of an electric, magnetic or electromagnetic field to at least one section of the absorption spectroscopy system which section is isolated from the gas sample but is within the transmission path of the electromagnetic radiation that is transmitted between the at least one source and at least one detector, thereby to suppress or modulate a spectral artifact resulting from absorption by at least one gas species within the at least one section. Apparatus, systems and methods according to the invention may use one or more applied electric, magnetic and/or electromagnetic field to alter the transitions between quantum energy states of one or more gas species, thereby to alter the absorption wavelengths of the gas species for improved detection and/or measurement in an absorption spectroscopy system. The applied field may be used to influence absorption by interferents and/or measurand gas species. In this way, applied fields can be used to suppress or modulate at least one absorption spectrum artifact, for the purpose of improved gas detection and/or measurement.

In an example, an applied magnetic, electric or electromagnetic field can assist detection and/or measurement of a measurand parameter of one or more gases in a measurement chamber, by changing the quantum energy state transitions of one or more interferents located in different sections of an absorption spectroscopy system isolated from the measurement chamber—i.e. the field may be applied to only part of the transmission path of the electromagnetic radiation within the absorption spectroscopy system. As one example, changing the absorption wavelengths of oxygen in sections of the absorption spectroscopy system outside the measurement chamber allows a separation of this oxygen's absorption lines from the absorption lines of oxygen inside the measurement chamber. This mitigation of the interference effect of oxygen or other interferents that may be encountered in an absorption spectroscopy system outside the measurement chamber makes it much more practical to use air as a purge gas for cleaning sections of such systems.

In this air-purge example, the measured gas species and interferent are both oxygen and yet the absorption spectra can be influenced differently by applying different electromagnetic fields for different parts of the system (e.g. a measure chamber and a separate air-purged volume) to create different absorption properties for the same gas species in different parts of the system. In other examples, a measured gas species and an interferent may be two different constituent gas species within a measurement chamber (e.g., a sample chamber or furnace or exhaust flue) or elsewhere in the transmission path of the electromagnetic radiation. Note that the influence on the spectroscopic absorption properties of an applied magnetic field dominates over the effect of any attraction or repulsion of gas species caused by that field due to their paramagnetic or diamagnetic properties.

The inventors have determined that it may not be necessary to actually measure absorption by the interferent that is present in a purge gas, after shifting the interferent's quantum energy transitions in a way that allows isolation of the absorption wavelengths of a measurand gas species in the measurement chamber from the interference effect. The ability to shift and/or modulate absorption by an interferent in a purge gas can provide great cost savings by allowing inexpensive gas mixtures such as air to be used as a purge gas in an absorption spectroscopy system, even when one of the measurands is oxygen concentration.

The application of magnetic, electric and/or electromagnetic fields to influence the known quantum energy state transitions of atoms and molecules that are represented in absorption profiles of gas species is a significant departure from previously available absorption spectroscopy systems. Some previous solutions have relied on the catalogued temperature-dependent absorption wavelengths and absorption profiles (held in databases such as the HITRAN and HITEMP spectral databases) to identify the constituent gases; others relied on estimating the effect of the purge gas by measuring its composition and the temperature distribution along the measurement path and the effective purge gas absorption path length.

Described below are various new systems and methods that use magnetic, electric and electromagnetic fields to improve or simplify gas detection and/or measurement in an absorption spectroscopy system, by mitigating problems associated with interference and noise. Throughout this document, references to an applied field or an electromagnetic field are intended to encompass one or more electric, magnetic and/or electromagnetic fields, unless a more specific meaning is specified. Various described implementations use applied fields to influence quantum energy state transitions of gas molecules to influence absorption wavelengths. Other features, advantages and implementations of the invention will become apparent from this specification including the drawings.

Note that although some of the detailed explanations and systems that follow may illustrate use of the invention for second harmonic (2 f) wavelength modulation spectroscopy (WMS) for detection and measurement, the novel technique described in this patent specification is applicable to any harmonic absorption measurement, i.e. anything from 1st harmonic (direct absorption) to second or higher order harmonics.

The spectroscopic interferences described above come about from processes, other than absorption by a measurand gas species, contributing to a change in light intensity at a detector. In this invention, electric, magnetic and/or electromagnetic fields are purposely used to alter the energies of quantum states belonging to one or more of a measurand gas species, interferent or both at specific locations along the measurement path. These fields can change the absorption cross-section of a measurand gas or cross-interferent at a given wavelength, whilst having no impact on optical noise or other causes of baseline noise, enabling their relative contributions to be isolated. The nature and size of the changes will be system dependent. Furthermore, since the magnitudes and gradients of the applied fields are well defined in three-dimensional space, their selective application along the measurement path can allow the collection of 2-dimensional spectral data. With appropriate processing, this data may be used to extract $\sigma_v$ & $S_v$ as a function of the pathlength (l), such that measurement uncertainties relating to pressure and temperature inhomogeneity are effectively eliminated.

BRIEF DESCRIPTION OF DRAWINGS

A number of example systems and methods are described below with reference to the accompanying figures in which:

FIG. 1A shows a spectrum obtained using 2 f WMS in the absence of a magnetic field, and FIG. 1C shows a spectrum obtained using 2 f WMS in the presence of a magnetic field; and FIG. 1B is a schematic representation of the effect of an applied field on the energy of quantum states of the $O_2$ molecules.

DETAILED DESCRIPTION

Figure 1A:
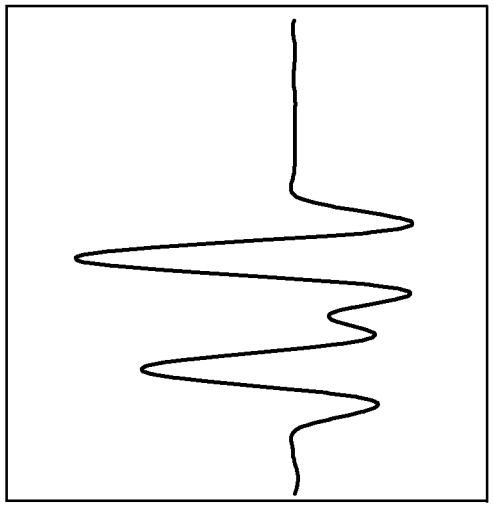
FIGS. 1A to 1C show the effect of applying a magnetic field on quantum energy states on an example absorption spectrum for oxygen, which includes a pair of absorption lines.

As noted above, absorption spectroscopy is known for use in gas analysis, including for determining the presence of a particular gas species in a measurement volume and for measurement of parameters including concentration of the individual gas species in a gas sample. In this context, the gas sample that is being investigated is not necessarily an extracted 'sample'—it can be the content of any measurement volume or chamber, and the detector is used to detect the effects of absorption by gas species within that volume. The measurement volume may be, for example, an industrial process chamber such as a furnace, or a fluid flow duct such as an exhaust flue from an industrial process chamber, or an extraction volume for holding an extracted sample. In an example absorption measurement system, a source of electromagnetic radiation emits a beam of radiation towards a detector, which may be a solid state photovoltaic or photoconductive detector, a pyrometer, a thermopile or bolometer, for example. The source of electromagnetic radiation may be a tuneable laser source, such as for example a tuneable diode laser (TDL), or a broadband source such as an incandescent source or light emitting diode (LED) in combination with a wavelength range selective element, such as an optical passband filter or grating.

Described below are examples of apparatus, methods and absorption spectroscopy systems using fields applied to specific sections of an electromagnetic radiation transmission path through the absorption spectroscopy system, to enhance or simplify detection and/or measurements.

The influences of external electromagnetic fields on the energy levels of polyatomic molecules are complex and are not described in detail here. For illustrative purposes, the effect of external fields on an atom is described here, since the treatment is more concise and the general concepts are also applicable to more industrially relevant species, such as $O_2$ and $CO_2$.

Collections of molecules may be considered as charged particles, which may transform in relation to each other in a distinct and quantized manner. These charged particles interact with external electric fields in a conventional manner, for example, positively charged particles are repelled by positive electric fields and vice-versa. Similarly, the motion of charged particles represents an electric current that generates magnetic flux via induction. Depending on the electronic structure, electrons may occupy orbitals so that their net movement results in some orbital angular momentum ($\hat{l}$). A constant of proportionality, referred to as the gyromagnetic ratio ($\gamma_l$), defines the relationship between $\hat{l}$ and the orbital magnetic moment $\hat{\mu}_l$ according to equation (11). It is common to regard the magnetic moment as precessing around an applied field at the Larmor frequency which, in this instance, is the product of the applied field and the gyromagnetic ratio[9].

$$\hat{\mu}_l = \gamma_l \hat{l} \tag{11}$$

The classical picture is somewhat complicated by the presence of spin which is an intrinsic form of angular momentum carried by particles such as protons, neutrons, electrons and photons. For example, electrons possess a spin of ½; the magnetic moment arising from this intrinsic spin and their motion around a particle generates a total magnetic moment (μ) according to (12) where $\hat{S}$ is comprised of vectors describing the electron spin orientations $\hat{s}_i$. In equation (12), $\hbar$ represents the reduced plank constant, $\mu_B$ is a "Bohr magneton" and $g_e$ is the "g-factor" of an electron, which relates its observed magnetic moment to its angular momentum.

$$\hat{\mu}_S = -g_e \frac{-\mu_B}{\hbar} \hat{S} = \gamma_S \hat{S} \tag{12}$$

The application of an external electromagnetic field has the effect of shifting the energies of quantum states that might otherwise overlap with one another, commonly referred to as degenerate energy levels. For example, consider an electron orbiting an atom on an x/y plane; in the absence of an external field, clockwise and anticlockwise rotation would be considered degenerate since the total energies of the resulting states should be approximately equal. If, however, an external field was applied in the Z-direction such that $H_Z>0$, then the clockwise state should be of lower energy than the anticlockwise state (left hand rule). The influence of a magnetic field is referred to as the "Zeeman" effect and the influence of an electric field as the "Stark" effect. The Zeeman effect, for historical reasons, can be split into three different regimes, the "normal Zeeman effect", the "anomalous Zeeman effect" and the "Paschen-Back effect".

In the normal Zeeman effect, the electron spin is zero and the only contributor to the induced magnetic moment comes from orbital angular momentum. In such cases, the energy shift induced by a field depends on the projection of the orbital angular momentum onto the magnetic field axis, as encoded by $M_L$, and the gyromagnetic ratio (13) ($B_Z$ and $\hat{L}_Z$ are the components applied field and orbital angular momentum in the Z direction). In this case, the energy levels are split into 2 L+1 components, for which adjacent components are equidistantly separated by an energy proportional to the applied field.

$$E = \langle \hat{L}_z, LM_L | -\gamma_l \hat{B_Z} | LM_L \rangle = -\gamma_l \hbar M_L B \tag{13}$$

The anomalous Zeeman effect describes the effect of the magnetic field on systems where $S \neq 0$. In such cases, the spin and orbital angular momentum couple to give a "total angular momentum" (J), and the orbital and spin contributions to $\hat{\mu}$ combine to give $\hat{\mu}_J$, which can adopt 2 J+1 projections, indexed by the quantum number $M_J$, into the applied field so that the splitting pattern is more complex (14). In this scenario the g-factor, $g_J$, depends on the L, J as S quantum numbers as shown in (15). The Paschen-Back effect, by contrast, occurs when the applied magnetic field is sufficiently large that it can completely break down spin-orbit coupling. Once this threshold has been reached, the splitting pattern is simplified and resembles the normal Zeeman effect.

$$E_{M_J} = g_J \mu_B M_J B \tag{14}$$

$$g_J \simeq \frac{3J(J+1) + S(S+1) - L(L+1)}{2J(J+1)} \tag{15}$$

The Stark effect can be considered as an electric analogue of the Zeeman effect, in that an electric, rather than magnetic field shifts the energies associated with a given quantum state. One highly relevant point of consideration, with regards to both the Zeeman and Stark effect, is that the application of an electromagnetic field changes the absorption cross section with respect to the polarisation of incoming light. For the avoidance of ambiguity, the absorption spectrum of a sample in an applied field will change depending on the polarisation of the light source, relative to the applied field. The influences of the Zeeman and Stark effects on molecular energies are substantially complicated by the potential for coupling of the vibrational and rotational energies, in addition to orbital and spin angular momentums, but a full description of this coupling is not required for an understanding or implementation of this patent specification. Some exemplary details may be found in the following references[10-12], which can be used to assist in predicting the expected absorption spectrum of a molecule, under a given set of physical conditions, with respect to different polarisations of light. Several available computer programs may also be used, which enable the simulation of molecular spectra, such as "PGopher"[13]. However, it should be noted that various systems and methods that implement the invention are able to make use of the application of magnetic, electric or electromagnetic fields to sections of the pathway of the electromagnetic radiation to isolate measurand gas absorption spectra, without the need to predict or measure the effects of the electromagnetic field. For example, shifting the energy transitions of the molecules of an interferent gas species in a spectroscopic system can be used to shift its absorption lines away from the absorption lines of the measurand gas, allowing an air purge to be used without the usual complications and compromises on the measurement accuracy that this would entail. Additionally, the shifting of energy transitions can be monitored and used to isolate optical noise and other baseline noise, by determining which features of an output signal are not shifted by the application of the electromagnetic field, and then to remove this noise.

Figure 3:
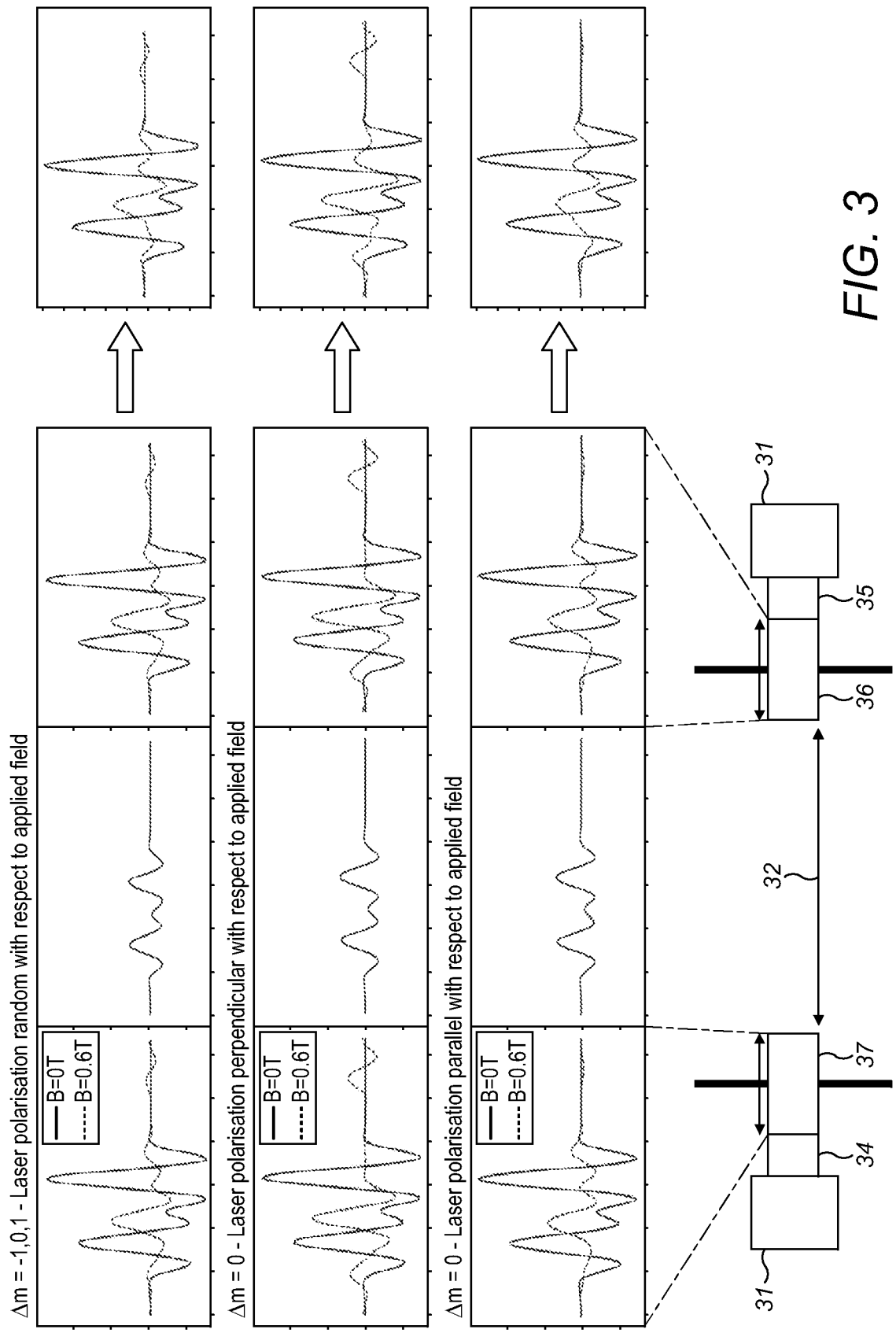
FIG. 3 shows an arrangement of a spectroscopic gas analysis system for making in situ measurements, with example absorption spectra obtained using three different laser polarisations with respect to an applied field.

The schematic in FIG. 3 shows an arrangement of a spectroscopic gas analyser for making in situ measurements of an industrial process. In situ measurements may be desirable for fast, real-time measurements, in contrast to the phase delay, expense and complexity of an extractive measurement. In one example, light from a tuneable diode laser (31), emitting light within a wavelength range where oxygen absorbs, is fed into a gas sample path (32) containing process gas, where the oxygen concentration is required to be known. After passing through this sample gas, the light is collected at the detector (33). A decrease in the detected light intensity is seen at wavelengths where the emitted light is absorbed by oxygen molecules present in the sample gas. This example is for oxygen, but the same general principles may be applied for many suitable gas species. The decrease in detected light intensity is wavelength, pathlength and gas species dependent and is described by the Beer-Lambert Law of equation (10).

Optical elements (34 and 35) may be present such as windows, lenses, mirrors, pass band filters and attenuators, including windows between sealed zones that isolate the purge gas from a sample gas, and elements to shape, concentrate or diffuse the light beam or to transmit a desired wavelength range. There are purged regions (36 and 37) where, as described earlier, a purge gas is used to maintain the emission and detection optics and/or electronics in an undamaged and cooled state. There may be additional sealed sections, which may not be subject to an active purge flow and may be filled with an optically non-absorbing gas or air. Such a system has been described in prior publications[14 and 7]. One or more individual oxygen absorption lines may be selected for measurement and the tuneable laser diode is scanned across the absorption line(s). The absorbed light may be measured from the detector signal as a direct absorption or by using second and/or higher harmonic processing or by a combination of these.

In FIG. 3, sections 36 and 37 of the spectroscopic system are 35 cm purge regions containing air at a normal temperature and pressure (NTP), whereas the central region 32 is 105 cm long and contains a blend of 5% $O_2$ in $N_2$ at 1300K. The top, middle and bottom slices of detected spectra, which are shown above the schematic representation of the apparatus, represent the WMS (2 f) $O_2$ spectra of the different regions, where the laser polarisation with respect to the field in the purge sections is one of random, perpendicular or parallel respectively. On the right of FIG. 3 are the resulting spectra obtained by passing light through each region, firstly with a magnetic field applied to the purge gas (the result shown using a dashed line) and secondly without a magnetic field (shown with a solid line). Note that the position of the spectral absorptions in the field perturbed spectra are significantly different from those shown in FIG. 1. This is due to the higher field strength applied in this example. Also, the form of the spectra resulting from a purge section for which the applied magnetic field is parallel or perpendicular with respect to the laser polarisation are different, with a random orientation representing the average of parallel and perpendicular spectral components. The magnitude of the absorption lines in the purge sections are significantly greater than in the central region, due to the higher concentration and density (due to the lower temperature) of $O_2$ in these regions. Regardless of the field orientation used, the overlap of spectra in the purge sections is diminished relative to the central region of interest. The nature of the residual spectral overlap can be nuanced by adjusting the field strength applied to the purge sections, or by adjusting the applied field orientation with respect to the laser polarisation. Use of this approach can aid the decomposition of the final spectra into components relating to the different sections.

Figure 10:
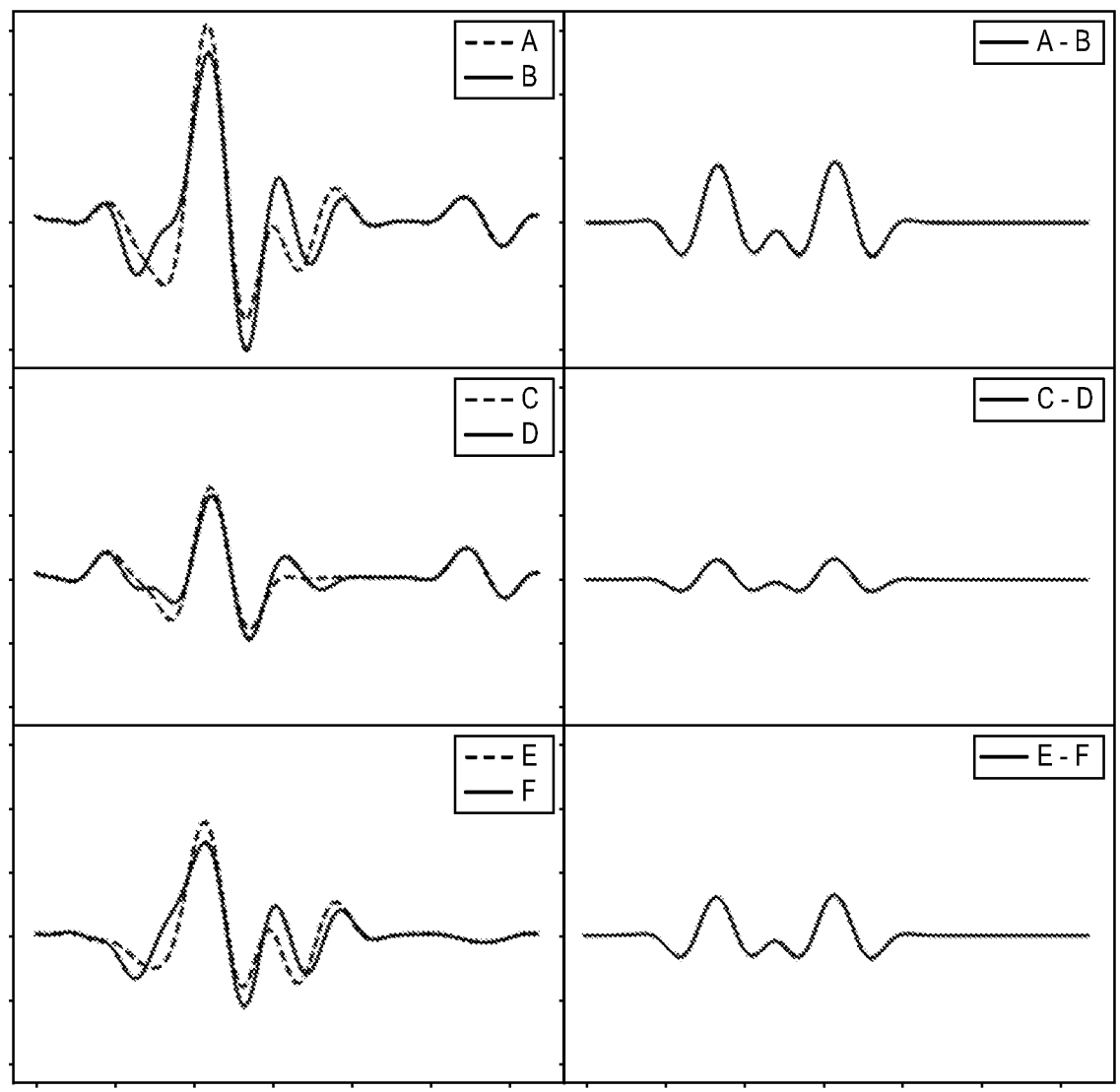
FIG. 10 shows example absorption spectra obtained using the system of FIG. 4.

The applied magnetic field or fields may be at a preferential orientation or orientations, determined either theoretically and/or empirically, such as at two orthogonal orientations, for example perpendicular and parallel to the light source and/or light source polarisation, since the resulting spectra are slightly different for different orientations (FIG. 10). If the light source is unpolarised, it is possible to polarise, for example by using a polariser optical element or other appropriate means, in order to benefit from the spectral differences.

Polarisation may be implemented, for example, by orienting windows or other optical elements at an angle, such as the Brewster angle, for selective transmission and reflection to achieve a particular preferential polarisation of light with respect to an applied electric, magnetic, or electromagnetic field. Even for polarised light sources, the use of oriented optical elements helps to avoid back reflections which might lead to etalons. The orientation of an optical element can be altered, if required, such as when replacing a laser diode with another with slightly different polarisation properties, or to alter the polarisation purity and/or intensity of the main beam. A portion of light reflected from an optical element can be redirected by secondary optics so that it passes through a similar optical path to the transmitted portion of light, so that the two portions can be detected simultaneously, by a single detector, or by a plurality or detectors.

In an example implementation, incoming light is modified by a polariser, or other means, so that two or more distinct polarisations (e.g. left-handed polarised light (LH) and right-handed polarised light (RH), or parallel and perpendicular) pass though the gas sample in the presence of the applied field, and are detected by one or more detectors.

In another example, one or more detectors distinguish light passing through a field via one or more paths, such that the intensity of light of a particular polarisation, relative to an applied field and light source, can be recovered.

In another example, the intensity of light of different polarisations reaching a detector is modulated, for example by rotating a linear polariser in the light path or by using stacks of liquid crystal panels.

In an example implementation, polarised light of different polarisations is received by a single detector, for which the transmissible polarisation is modulated, and the detector's output signal is processed so that the temporal profile of the phase angle is recovered, and hence the Faraday spectrum may be inferred and used to make a measurement of concentration and or other useful properties. This can also be implemented with multiple detectors.

In another example implementation, a method of gas detection and/or measurement comprises comparing polarisation of light prior to passing thought the gas sample with the polarisation after passing through the gas sample (in the presence of an applied field), to infer the proportion of light scattered by dust or some other medium. When light is scattered by dust, it randomises the polarisation and phase, so that the polarisation purity will decrease with increasing scattering. By implementing the polarisation comparison in combination with the measurement of the Faraday spectrum, dust loading can be measured independently of light transmission and sample absorption. This information can then be used for correction of absorption measurements.

Another example method includes spatially and temporally modulating the optical path of a light source, for example using spinning mirrors or digital light processing (DLP) arrays, such that its optical path varies in time and space. In this example, the light path may be interrupted by a scattering medium such as a wall or pipe, so that the light is scattered. The light can be collected by one or more detectors, with either fixed or variable polarisers. In an example implementation, information from the detectors is combined with the temporal and spatial modulation pattern to build a polarisation intensity image. The information from this image can be used to measure gas concentration in two-dimensional space, for example to aid leak detection. In one example implementation, a magnetic field gradient, or a pulsed magnetic field, is applied to a region of interest in a light path and/or an electric field gradient and/or pulsed electric field can be used.

In one example implementation, a three-dimensional image of measurand gas properties is inferred from the spectroscopic measurements, from which additional types of measurement then become possible. For example, if high pressure air were to leak from a pipe into an atmosphere of air, the precise location could be inferred by measuring the density and temperature profile of $O_2$ in three-dimensional space. Another example is measurement of the Doppler line shift of the $O_2$ in the leak region, to extract the velocity vector and determine the direction of a leak. Where the medium gas properties are homogenous (e.g., air), a recovered three-dimensional absorption image can be used to recover information about the applied field. This could be useful for calibration of an instrument that is used to infer a three-dimensional image of measurand gas properties. Alternatively, this could be used to aid in the manufacture and maintenance of certain instruments with large gas volumes and large field gradients, such as nuclear magnetic resonance (NMR) or magnetic resonance imaging (MRI) machines.

Figure 4:
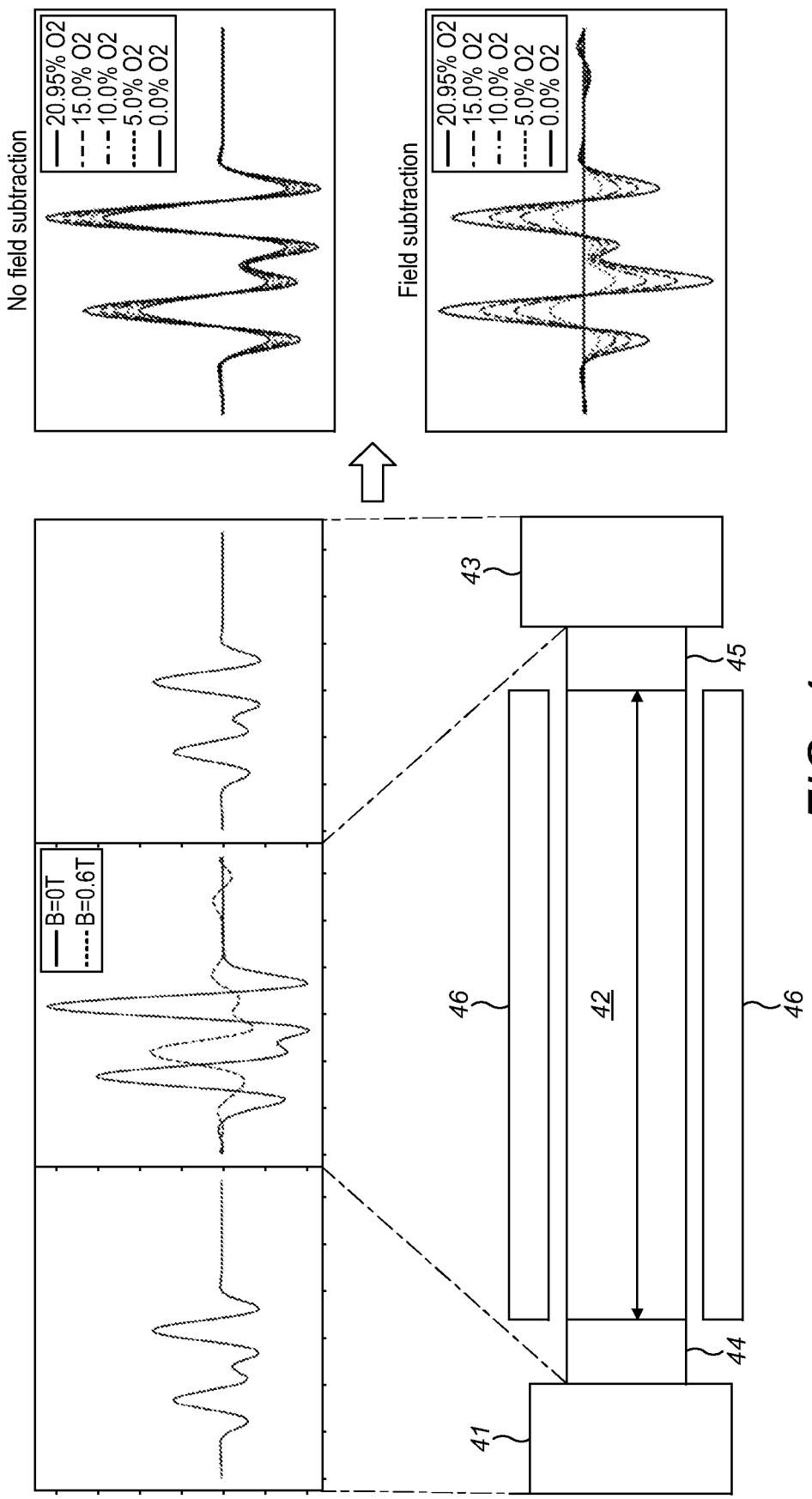
FIG. 4 shows a spectroscopic gas analysis system, with a central section subject to an adjustable field, and example absorption spectra.

FIG. 10 shows, in the top, middle and bottom left sections of the figure, the expected spectra with (dotted) and without (solid) gas in the central sections shown in FIG. 4, where the laser polarisation is either random (A, B), perpendicular (C, D) or parallel (D, E) respectively, compared to a 0.6 T field applied to the purge sections. On the right are corresponding difference spectra. These difference spectra are identical to one another, but the spectra corresponding to the purge sections in the different polarisation regimes is not. For example, certain transitions predominate when the field is parallel with respect to the light polarisation, compared to perpendicular. It follows that, by careful selection of the field orientation, it is possible to differentiate gas signals originating from different regions of the measurement path. Additionally, certain orientations facilitate straightforward spectral subtraction. For example, the peak in the centre of spectrum D is flat when there is no gas present in the central region shown in FIG. 4.

An optically non-absorbing purge gas, such as nitrogen, may be used as a purge gas, but this is expensive and energetically wasteful. Cheap and plentiful air may be used as a purge instead either by using cooler air in conjunction with use of a sample "hot" oxygen absorption line, to negate absorption from the purge sections or by using calibrations and/or calculations to account for oxygen present in the purge sections and correct the measured absorption to determine the sample gas concentration. The purged air is ideally clean and free of interferent gases, other than oxygen. When purge air is used, there is still decreased accuracy due to sensitivity loss when using a "hot" line as opposed to a stronger absorption line, which is present even at lower temperatures. Also, if the absorption is corrected in signal processing to account for oxygen present in the purge sections, there is still increased uncertainty in the measurement due to variations in the purge penetration by flow and/or pressure fluctuations and temperature differences between the purge and sample sections.

Figure 11:
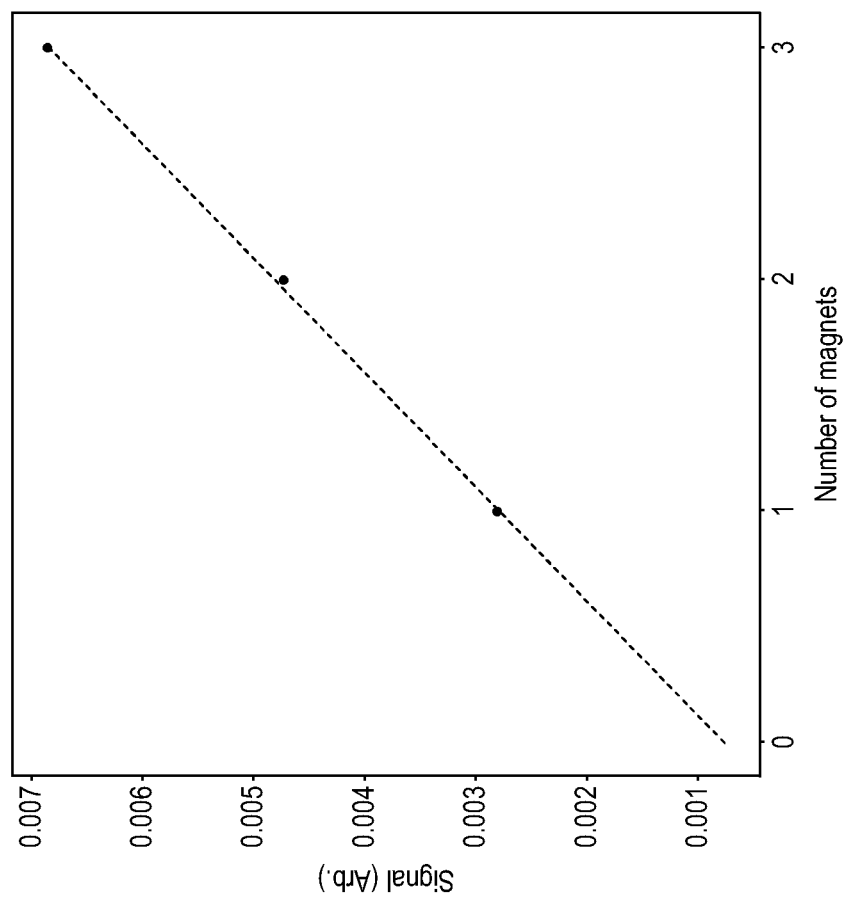
FIG. 11 shows example WMS oxygen spectra obtained using different numbers of magnets in the vicinity of a laser.
Figure 11:
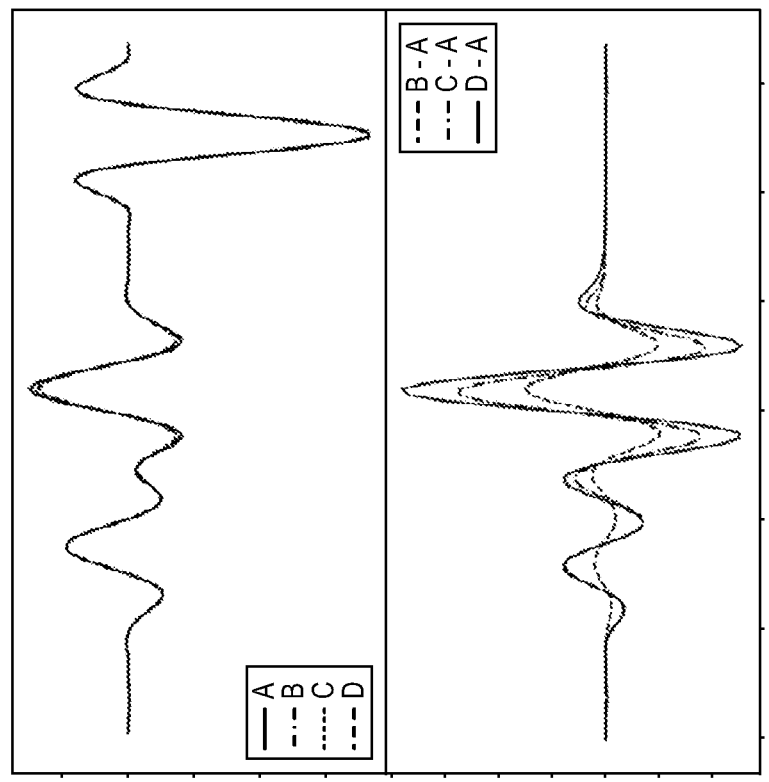

For an example system implementation, if static and/or varying magnetic fields (electromagnetic, permanent magnetic or combination) are used to encompass the light path of purge sections 36 and 37 and/or any sealed sections, an improved oxygen measurement may be obtained. It is demonstrated in FIG. 11 that the influence of the applied field over a spectral path is additive, such that the signal of an arbitrary length can be influenced if needed, simply by extending the field domain. The spectra on the top left of FIG. 11 are examples of WMS spectra obtained when there are 0 (A), 1 (B), 2 (C) and 3 (D) magnets in the vicinity of a laser measuring a pair of oxygen transitions. As the number of magnets increases, the intensity of one of the oxygen transitions decreases. The differences between the spectra are shown in the bottom left plot, and the magnitude of the differences plotted, as a function of the number of magnets, in the scatter chart on the right. Increasing the number of magnets increases the proportion of the measurement path encompassed by a magnetic field. The nullification of the oxygen signal is linear with respect to the proportion of the measurement path where the applied field exceeds some critical, application dependent threshold. It follows, from the behaviour described herein, that the entire signal originating from a purge section can be nullified by applying a critical field over its full length.

Similarly, if the pathlength over which a variably applied field is known, the ratio of the signal recovered when the field is present and absent may be used to calculate the total pathlength, provided that a suitable measurand is known to be homogeneous in physical properties and concentration over the entire pathlength. This is advantageous, from a measurement accuracy perspective, when the spacing between the detector and transmitter is known to vary unpredictably due to, for example, thermal expansion and/or contraction of a supporting structure. In addition, this method has advantages over established length measuring techniques, such as LIDAR (light detection and ranging), in that the actual measurement path used by the measuring apparatus, rather than a proxy, is used. This could be beneficial where the light undergoes a series or reflections which are impossible to emulate using a secondary, spatially offset source. Therefore, measurement of the effect of an applied field within an absorption spectroscopy apparatus can be used to determine the pathlength of an optical system by measuring the ratio of a signal where portions of light have passed within and outside of an electric, magnetic or electromagnetic field, or with the field being varied either spatially and/or temporally, to facilitate accurate scaling of absorption when making a measurand measurement.

Figure 1B:
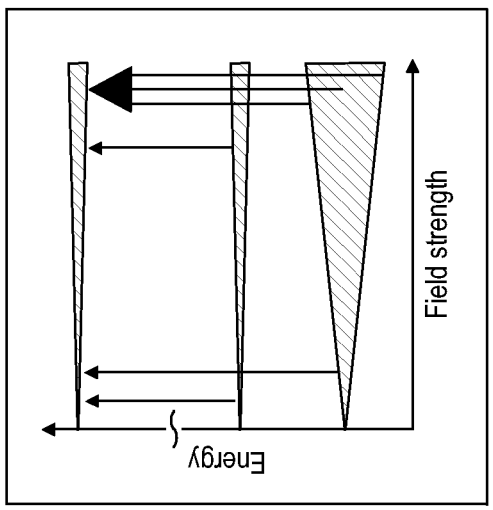
Figure 1C:
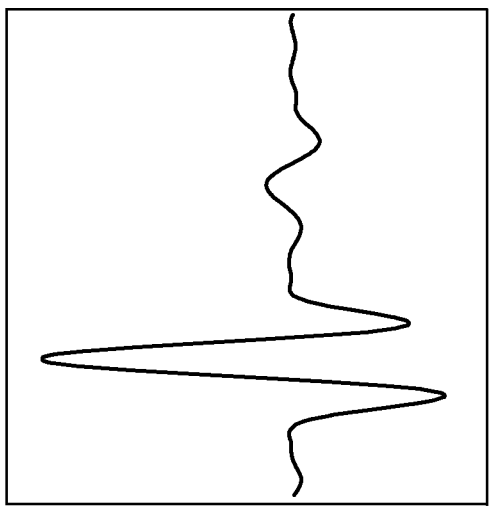

As previously described, degenerate or overlapping energy states may be present for a gas species, such as in the case of oxygen, which result in a single absorption line at a particular wavelength in the absence of a magnetic field. In the presence of a magnetic field, this single absorption line is split into multiple lines either side of the original peak absorption wavelength. This is shown in FIGS. 1A, 1B and 1C. The extent and separation of the splitting are dependent on the species, particular absorption line and magnetic field strength. The potential utility of this method is as follows:

The selected oxygen absorption line strength in the purge gas and/or sealed sections, encompassed by the magnetic field becomes reduced or invisible to the measurement—thereby enabling the benefits of using an air purge to be obtained without the negative side effects described above.

One or more of the split lines may be used as a line lock for the laser (wavelength reference), in case of laser wavelength drift, thereby negating the need for a reference such as a cuvette containing oxygen (as would be the case for a nitrogen purge) or for oxygen to be present in the sample gas, without the disadvantage of an absorbing purge gas line being present in the measurement.

If a varying magnetic field is used either via mechanical or electromagnetic means or combination, the absorbing oxygen line in the purge gas may be brought in or out of the measurement by adjusting the magnetic field strength for wavelength reference lock on the main oxygen absorption line, even if little or no oxygen is present in the sample gas.

If a varying magnetic field is used either via mechanical or electromagnetic means, the absorbing oxygen line may be brought in or out by adjusting the magnetic field strength for calibration checking and/or recalibration. Provided that any change in the sample oxygen concentration is relatively slow compared to the calibration time required and/or frequency of the varying magnetic field, the calibration may be checked/recalibrated by measuring the signal with and without the magnetic field present. If the signal when the magnetic field is present is subtracted from the signal when the magnetic field is not present, the resultant signal will be approximately solely due to absorption by the oxygen in the purge sections, irrespective of the sample gas oxygen concentration. If the length, temperature, pressure and the oxygen concentration in air in the purge section are known and/or calculated, the oxygen calibration may then be checked/recalibrated and hence, correspondingly, the sample gas concentration may also be validated, provided there is a known relationship between the ambient conditions of the purge and sample environments.

If permanent magnets are used, relatively low cost, low power, high field strengths may be obtained.

If a varying magnetic field is required, at least one oscillating or moving permanent magnet may be used and/or an electrically driven solenoid. A solenoid consists of a tightly packed coil of wire in a helix structure, which may be wound around a high magnetic permeability material core to increase the field strength, which acts as a magnet when electric current is flowing through it, where the field strength will be determined by the design, number of turns and drive current used or a combination of these factors.

According to one practical implementation of this invention, consideration is given to the physical design and the electrical and magnetic properties of the materials used with respect to the electric, magnetic and electromagnetic fields being applied. In the case of strong electric fields, this may require the use of electrically insulative materials; and for magnetic fields, this may need the use of materials to direct or localise fields. For magnetic fields, the physical design and materials selected (such as those with high magnetic permeability) may be used for optimising pole piece design to localise and concentrate the magnetic field and/or to limit the extent of the magnetic field penetration into peripheral regions. Pole piece designs and materials may be used for optimisation of magnetic field strength and profile for both permanent and electromagnets. When permanent magnets are used to create a magnetic field, selection of certain compositions for the magnets, such as rare earth magnets, enable strong magnetic fields to be obtained and for high temperature operation, magnets with a high Curie temperature should be used and/or localised cooling of the magnets to maintain the magnetic field strength. To create a magnetic field using permanent magnets, a single permanent magnet may be used or more than one magnet may be used in oppositely oriented pairs or other combinations to create localised or extended fields. In the case of using at least one electromagnet (solenoid), the material used for the coil should, ideally, have a low electrical resistance to minimise self-heating. High currents may be necessary to create the required magnetic field strength and the application of external cooling may be needed. Very high magnetic field strengths may be obtained by the use of cryogenically cooled superconducting electromagnets. This is particularly convenient when measurements are made in the vicinity of nuclear magnetic resonance (NMR) or magnetic resonance imaging (MRI) machines, where these types of magnets are intrinsic to their proper function. An electric field may be implemented by the use of two or more electrodes maintained at different voltages to create an electrical field between them. The shape and strength of the electric field will be determined by factors including the form and material of the electrodes and any material they are in contact with, the voltage difference between them and the separation gap. As the separation gap is increased, the required voltage to maintain the same field strength also increases. Above a certain electric field strength, electrical discharge of the gas mixture will occur.

A simplified format of an extractive version of the above-described system is shown in FIG. 4. The electromagnetic radiation output from the tuneable diode laser source 41 is fed directly into the sample chamber 42, since purge sections are no longer required. There is at least one gas input and one gas output to allow the passage of sample or calibration gases in and out of the sample chamber 42. The sample chamber may include pathlength enhancement designs such as a multi-pass cell (for example Herriott or White design) or a resonant cavity. The transmitted light is collected at the detector 43 and the signal is analysed to produce a gas concentration measurement. Optical elements 44 and 45 may be present and may include windows, lenses, mirrors, pass band filters and attenuators. In this format, there is no extra uncertainty produced by purge gas sections, but there are still advantages to having a varying magnetic field or fields applied across the sample gas section. A varying field or fields may be produced either by moving one or more permanent magnets or by control of one or more electromagnets 46, or a combination. As described previously, optical interference may be present in the form of constructive and destructive interference (etalons), which exhibits vibrational and temperature sensitivity. This overlays the real signal and may limit the achievable accuracy for the system. If the tuneable diode laser is scanned across a wavelength range containing one or more oxygen absorption lines, the optical interference will remain the same with or without a magnetic field, but the oxygen absorption lines may become split in the presence of the magnetic field. This is shown in FIGS. 1A, 1B and 1C, as an example.

FIG. 1A shows a 2 f-modulated spectrum obtained from a gas containing oxygen using WMS in the absence of a magnetic field. A pair of $O_2$ absorption lines can be seen. FIG. 1C shows the same transitions in a static magnetic field of 0.3 T, where one of the transitions is greatly broadened and appears diminished. FIG. 1B represents the effect of the applied field to the energy of the quantum states, giving rise to the previously mentioned modification of the absorption spectrum. The length of the arrows in FIG. 1B are proportional to the energy of the transitions.

In the example of FIG. 4, the purge gas regions 41 and 43 have identical pathlength and gas conditions, but the central region 42 is held at 296K and 1.5 atmospheres and is subjected to an adjustable applied magnetic field. The spectra shown on the top right of FIG. 4 show the resulting (2 f) spectra obtained as the oxygen concentration in the central region is varied from 0 to 21% without applying a magnetic field. On the bottom right of FIG. 4 are shown the spectra obtained by subtracting the resulting spectra in the absence of a field, from those obtained in the presence of a 0.6 T field at each concentration. In the latter case, a linear response is obtained, regardless of the conditions in the surrounding purge regions.

Figure 2:
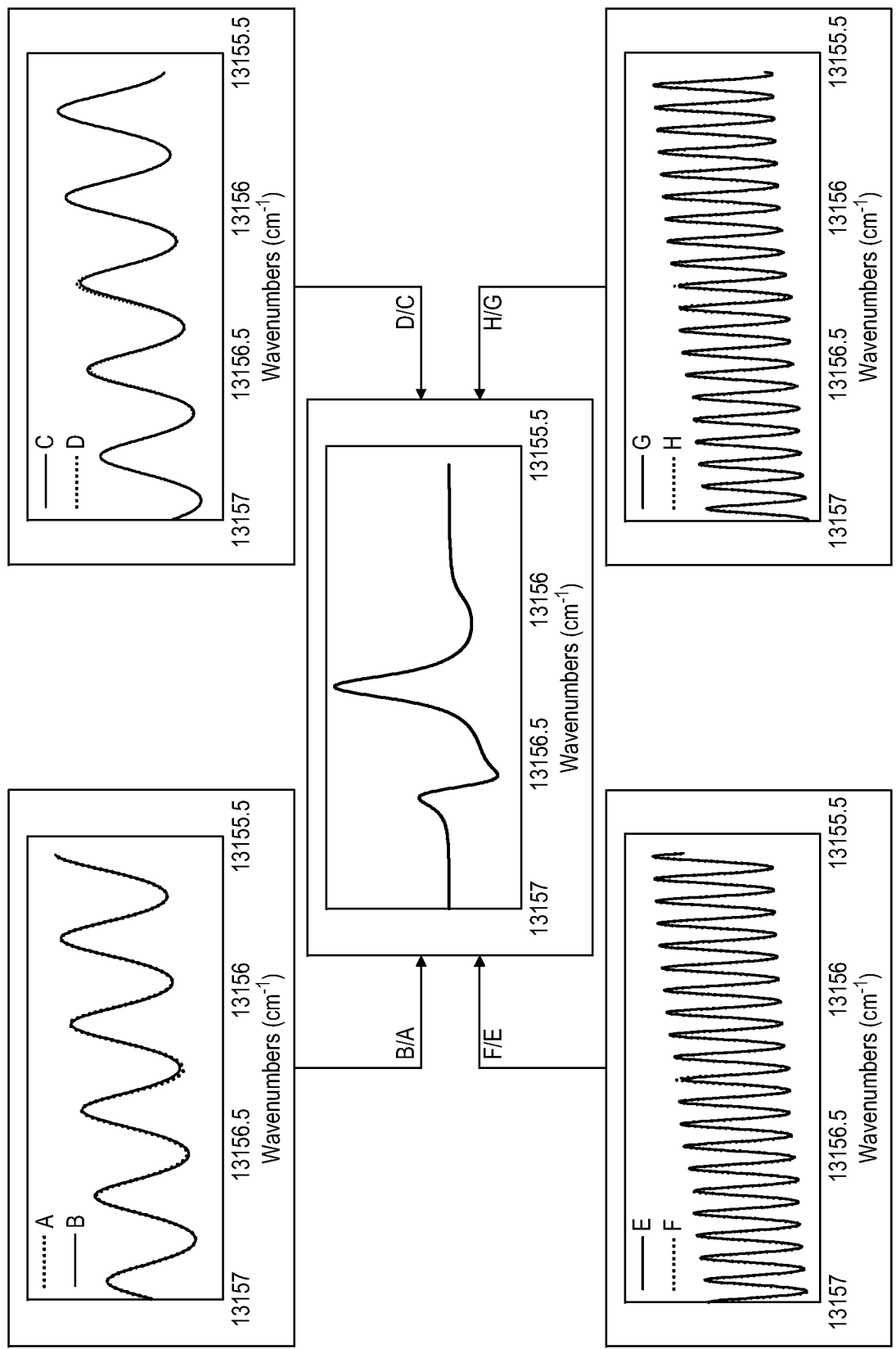
FIG. 2 demonstrates how an applied field can be used to remove spectral noise.

The potential utility of the above-described method and system is as follows: by subtracting the scanned signal with a magnetic field from the signal without a magnetic field present, the resultant signal will give the scanned signal with the oxygen absorption, but without the optical interference—thus enhancing overall accuracy of the measurement and reducing the influence of temperature and vibration (FIG. 2). Experimental results obtained by this method are shown for WMS spectra in FIG. 8 and for direct absorption spectra in FIG. 9.

FIG. 2 demonstrates how an applied magnetic field can remove spectral noise, even when it dominates a spectrum, using the same pair of transitions shown in the spectrum of FIGS. 1. A, C, E and G, are 100% $O_2$ spectra collected in field free conditions whereas B, D, F and H represent 100% $O_2$ spectra collected in a magnetic field of 0.3 T. The etalons in the topmost spectra have an FSR or around 0.07 $cm^{-1}$, and those on the bottom 0.25 $cm^{-1}$. Etalons in the spectra on the right are out of phase with those on the left. For each spectrum pair, dividing the signal obtained in the presence of an applied field by the field free spectrum results in the same signal, for which the magnitude is proportional to the concentration of $O_2$ in the region of the applied magnetic field. The signal is simply proportional to the difference in $O_2$ signal in the different field regimes (shown in FIGS. 1A and 1C).

Figure 8:
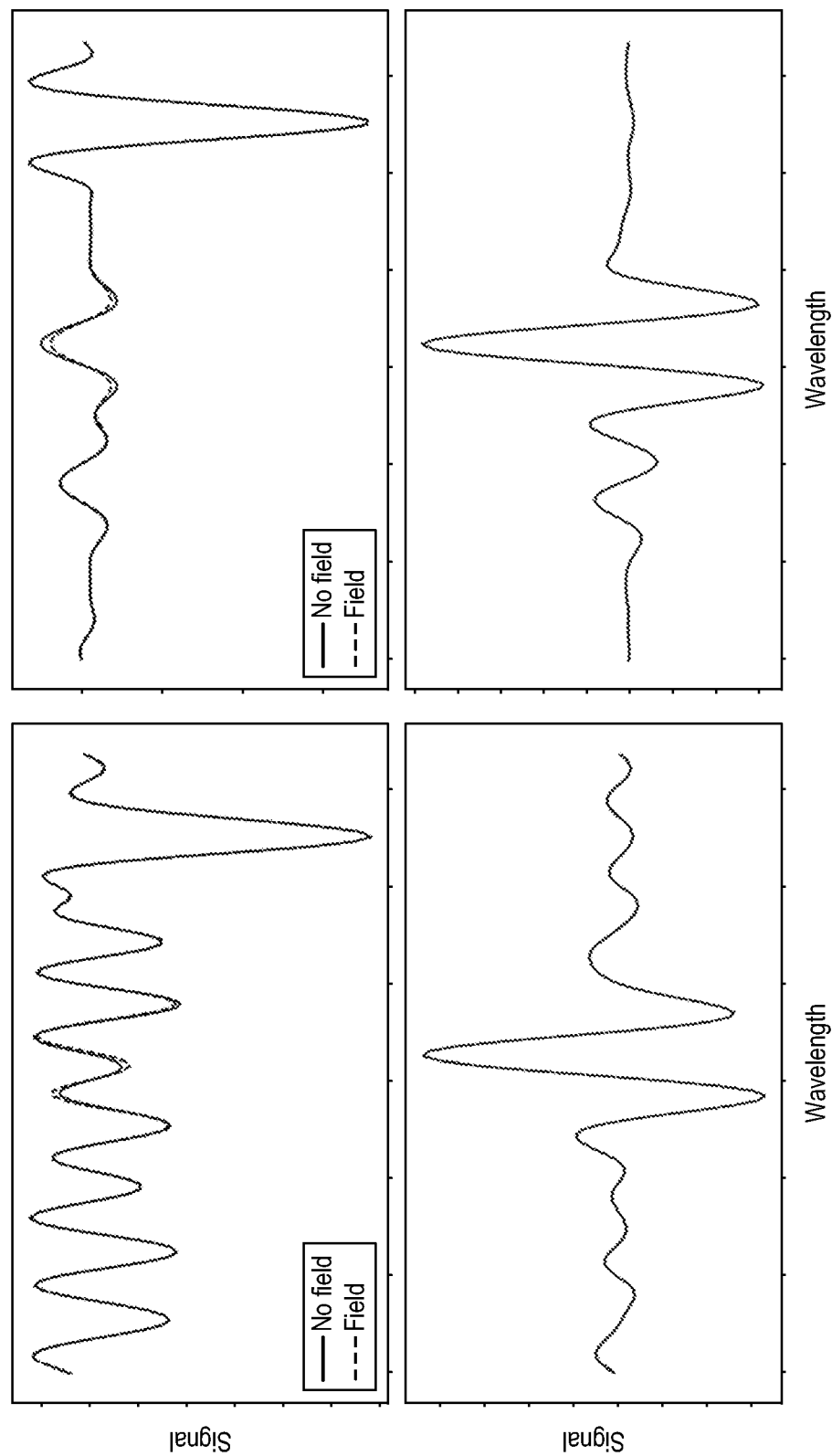
FIG. 8 shows example oxygen absorption spectra illustrating use of a magnetic field to identify optical interference (etalon) effects.

In the example of FIG. 8, the top left trace shows a pair of oxygen spectra obtained where an etalon is present in an optical measurement path. One spectrum was collected where a small region of the path (1.5 cm), was subjected to a magnetic field of around 0.1 T perpendicular to the laser's polarisation. The bottom left spectra show the difference between these two spectra: the oxygen transition for which the intensity was most impacted by the magnetic field dominates and the etalon signals have been significantly degraded. The small residual noise signal arises from a slight shift to the etalon fringe locations that occurred during the interval between collecting the two spectra (around 10 seconds). The two spectra on the top right were collected under identical conditions, except that the etalon was absent from the measurement path. The corresponding difference signal (bottom right) is of the same magnitude as that obtained when the etalon was present (the scales are identical).

Figure 9:
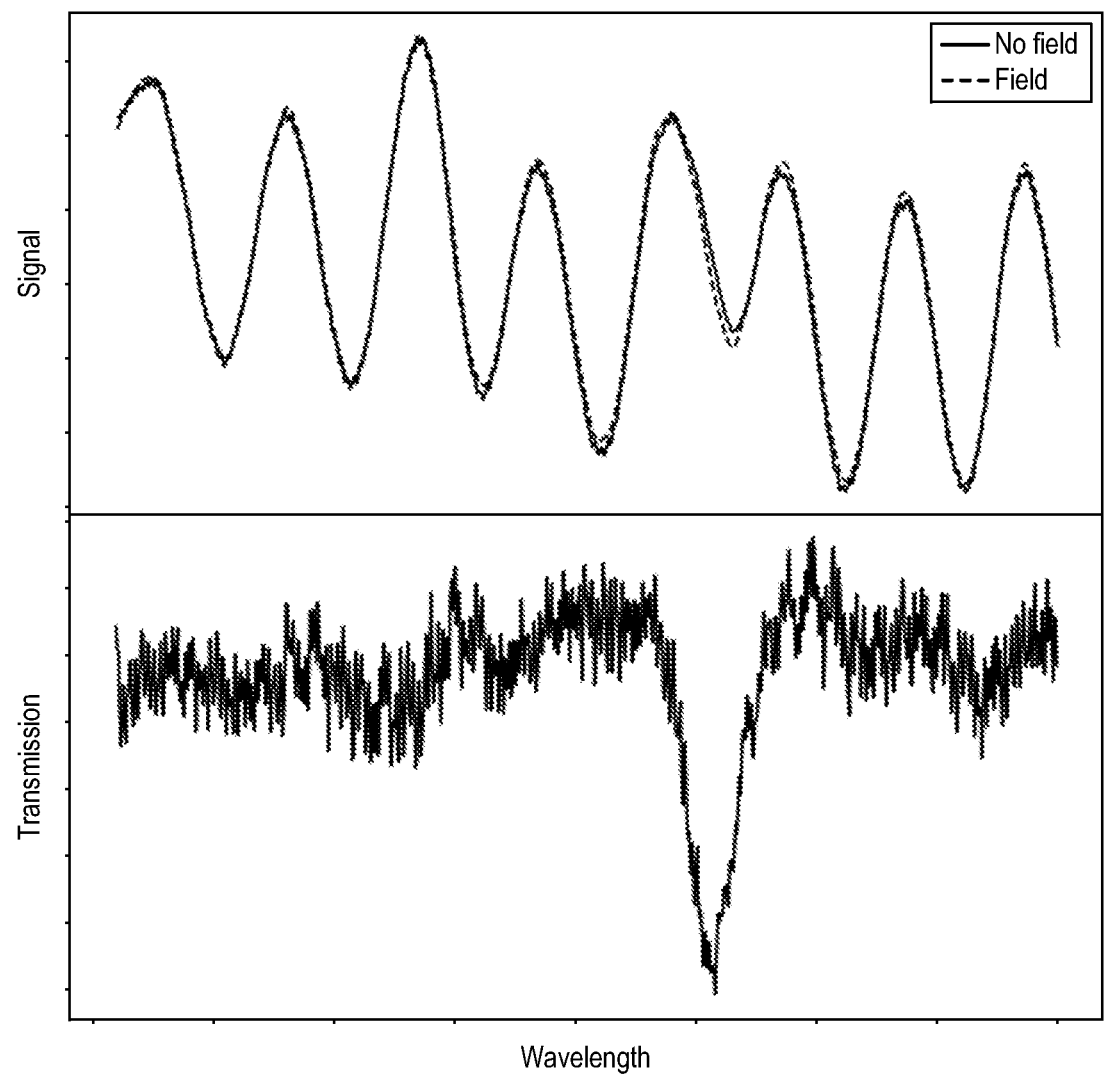
FIG. 9 shows example direct absorption spectra for oxygen, obtained over a measurement path containing an etalon, and a difference spectrum.

In FIG. 9, two direct absorption spectra (shown at the top) represent raw $O_2$ spectral signals obtained over a measurement path containing an etalon, one measurement being taken in the presence of a field of 0.1 T applied over a 1.5 cm region. The measurement noise is high, compared to the WMS spectra shown in the remaining figures, due to additional 1/f noise. The bottom spectrum is a ratio of the "field" and "no field" spectra at the top, amounting to a transmission spectrum of the oxygen lines degraded by the magnetic field. This difference spectrum is unaffected by the optical interference, illustrating the utility of the field differencing method for obtaining "clean" spectroscopic measurements.

Figure 5:
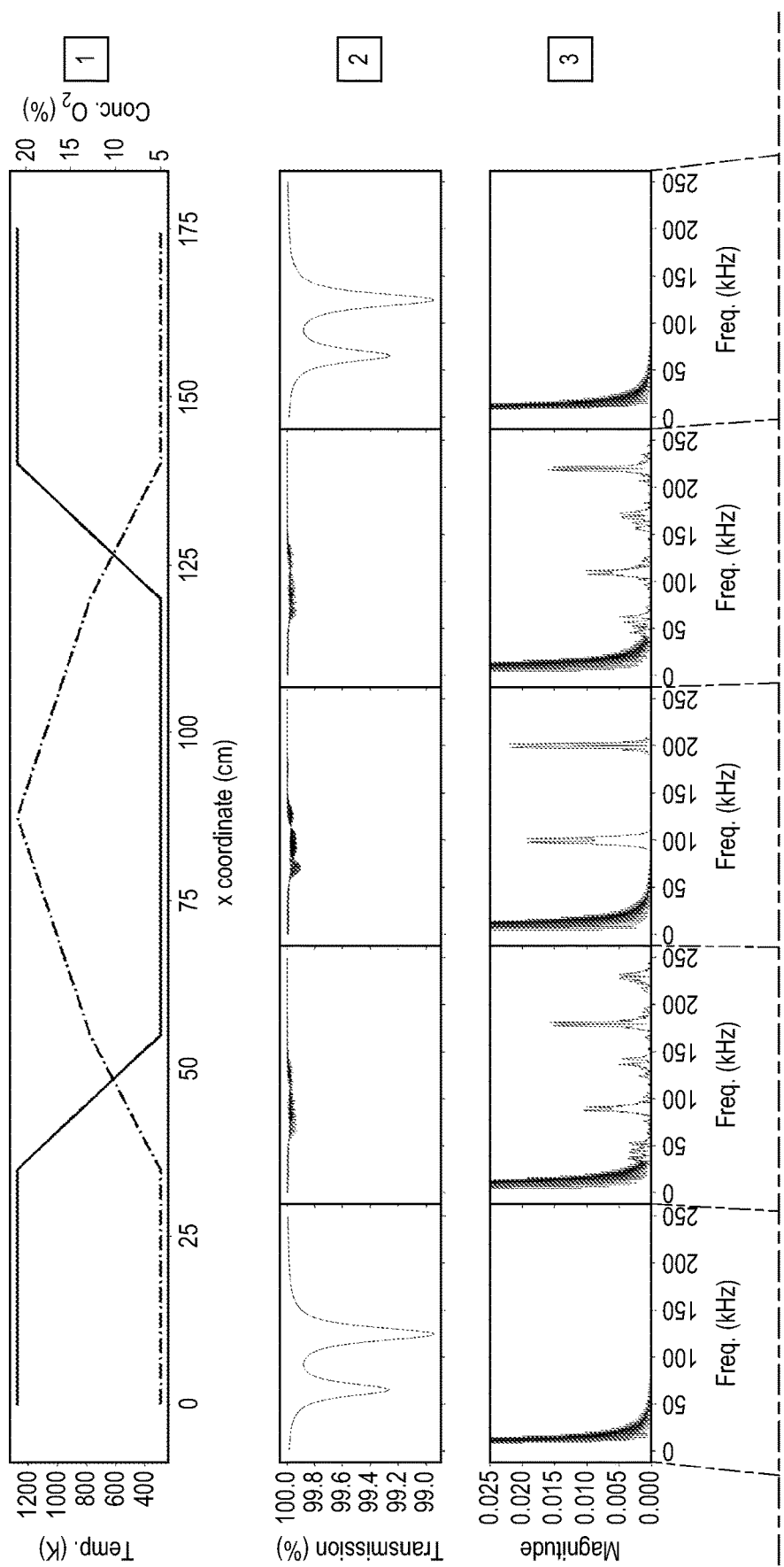
FIG. 5 shows a spectroscopic gas analysis system, with multiple sections subject to different applied field modulations to enable simultaneous measurement of gas concentrations in the different sections.
Figure 5:
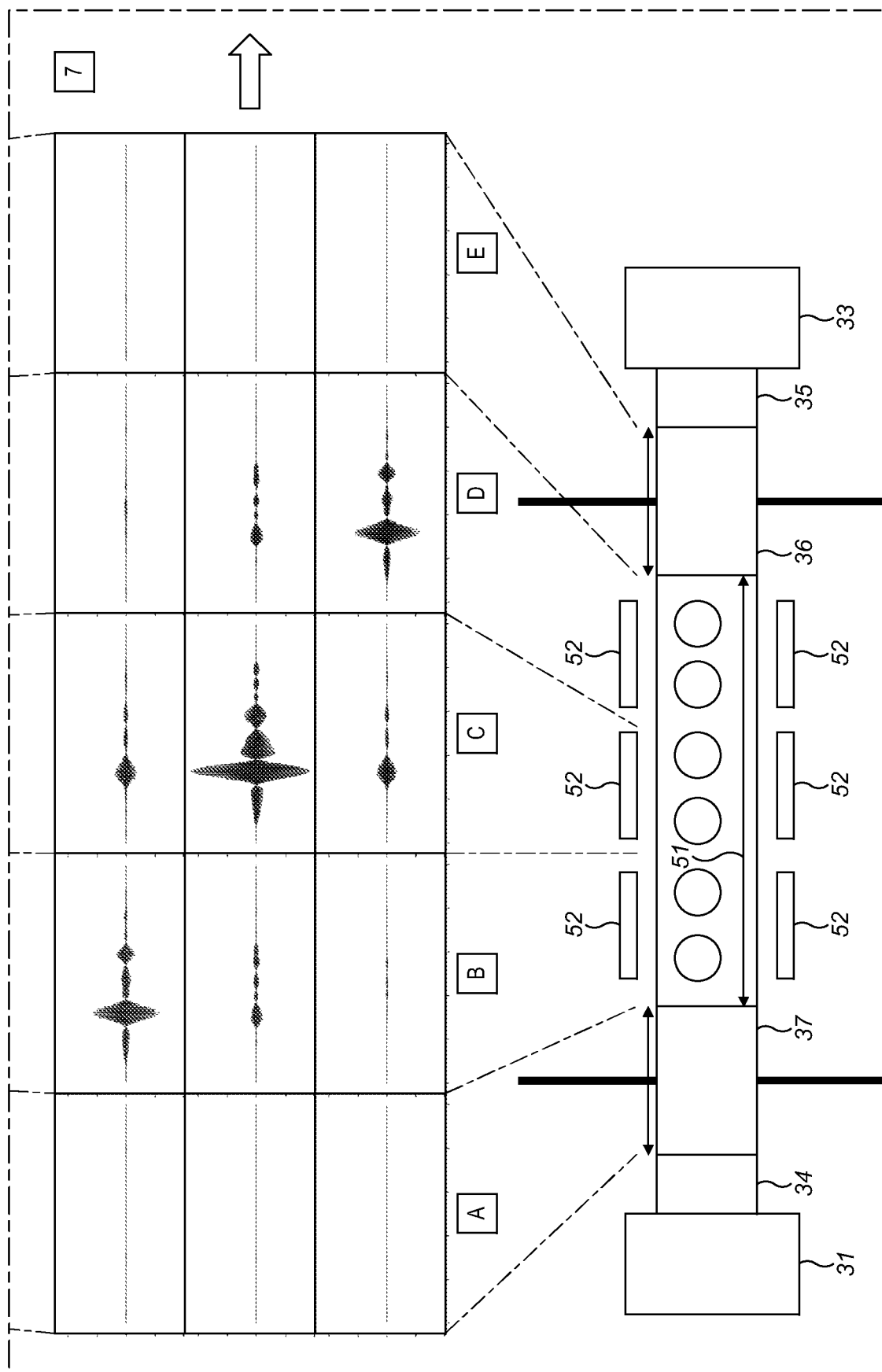
Figure 5:
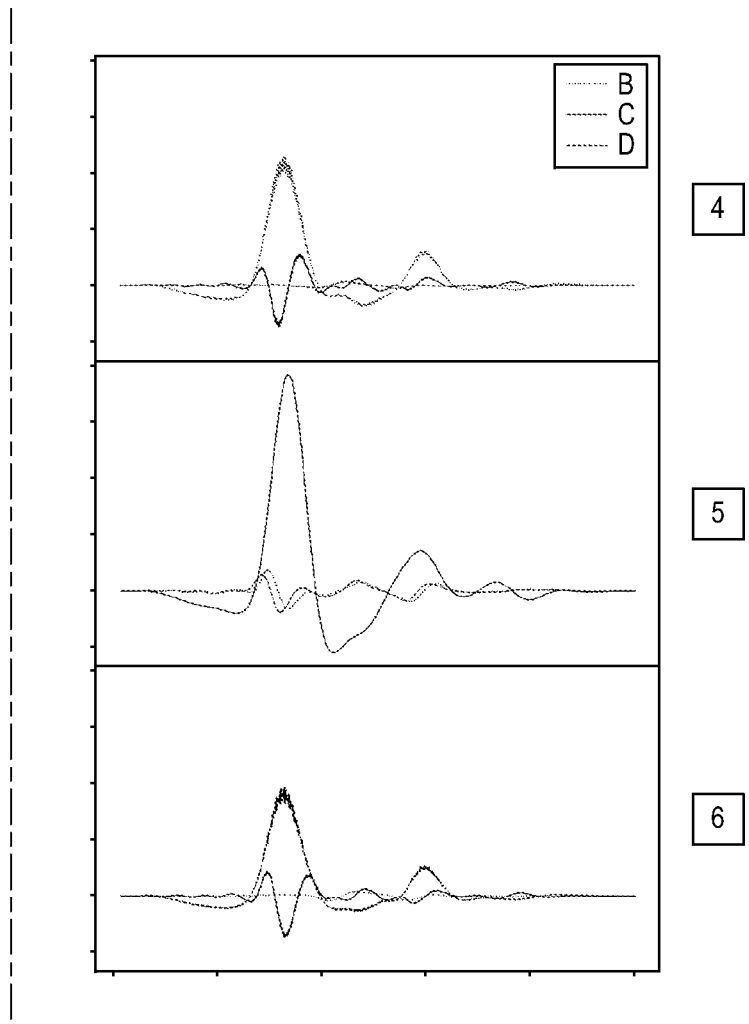

Note that a hybrid of the above examples, as shown in FIG. 5, could also be used where a porous or semi-open probe 51 is partially or fully extended across the sample width and a varying magnetic field means 52 is used to vary the magnetic field strength across one or more sections of the sample width.

In the example of FIG. 5, the measurement path consists of five zones, A, B, C, D and E. Sections A and E are 35 cm purge sections with air at NTP. Sections B, C and D are the measurement regions of interest and contain 5% $O_2$ in $N_2$. Sections B, C and D may be unequal in length and temperature—for example, B and D are 20 cm long and held at 773K, whereas section C is 65 cm long and held at 1273K. The temperature and concentration of the sections is shown at the top of the figure (labelled 1). Sections A&E, C&D and E give rise to different spectra, owing to their different physical conditions. Ordinarily, differentiating these three components would require complex deconvolutions to be applied to the final spectra, and numerous assumptions to be made regarding the temperature profile. Furthermore, it would be impossible to differentiate sections where the physical concentrations were identical (such as A&E and B&D). However, by applying different field modulation schemes to the different sections, it becomes possible to measure the gas concentration in the individual sections simultaneously and use the resulting spectra to infer the respective concentrations and the physical conditions. This example shows the effect of modulating sections B, C and D with a 1 T sinusoidal magnetic field with frequencies of 45, 50 and 55 Khz respectively, whilst applying no field to sections A and E. The resulting direct absorption spectra obtained from the different sections is shown in the second line of graphs of FIG. 5 (labelled 2). Sections A and E have the largest DAS signal, since the oxygen concentration and density are disproportionately high in these regions. The frequency spectra associated with the DAS signals from the different regions are shown in the third line of graphs, labelled (3) in FIG. 5. Sections B, C and D have significant components at intervals of double the field modulation frequency compared to sections A and E. This is because the splitting of the absorption lines is dependent on the magnitude of the applied field which, owing to its sinusoidal form, is maximal twice over a single modulation cycle (in this example). The rows of graphs labelled 4, 5 and 6 show the resulting spectra obtained by filtering the DAS signals arising from sections A-E with third order Butterworth notch filters centred at 90, 100 and 110 kHz. In the example above, the resulting sectional signals are maximal when the demodulation frequency is double that of the applied field, while signals from the other sections are suppressed. Shown with label 7 are the spectra obtained by low pass filtering the output obtained by demodulating the sectional spectra shown in 4, 5 and 6, with sinusoidal waveforms with frequencies of 90, 100 and 110 kHz. In each case, the spectral components from section B (dots), C (solid) and D (dashes) are shown. Spectra from sections with a field modulated at a different frequency than the notch filter and demodulation signal are suppressed. It follows that the resulting, selectively demodulated, signals can be used to infer the concentration, temperature and pressure of the corresponding sections independently, by appropriate analysis of the resulting spectral line shapes.

The potential utility of this method is as follows:

For example, if the scanned signal when magnetic fields are present over the air purge and sample sections is subtracted from the signal when only the air purge sections have magnetic fields, the resultant signal will be closely resembling that due to the oxygen absorption in the sample gas, without the influence of the air purge or optical interference.

If one or more sample sections are independently subjected to magnetic fields, the localised sample oxygen absorption may be probed and measured, whereby the local line height, width and shape may have information about localised sample concentration, pressure and temperature. This may allow profiling of the sample measurement width, which may be useful for certain industrial processes, where the sample width is a cross section of a duct or chimney and the industrial process is a combustion process, such as in power plant or chemical production facility.

Note that the above examples were for oxygen in the presence of magnetic fields, but other gases, especially paramagnetic gases such as nitric oxide and nitrogen dioxide, could also be similarly advantageously measured. Electric fields can also be used advantageously for appropriate gases, such as ammonia and water. The preferred implementation will depend on the gas species and also on whether high voltage fields are acceptable for the particular system.

Figure 6:
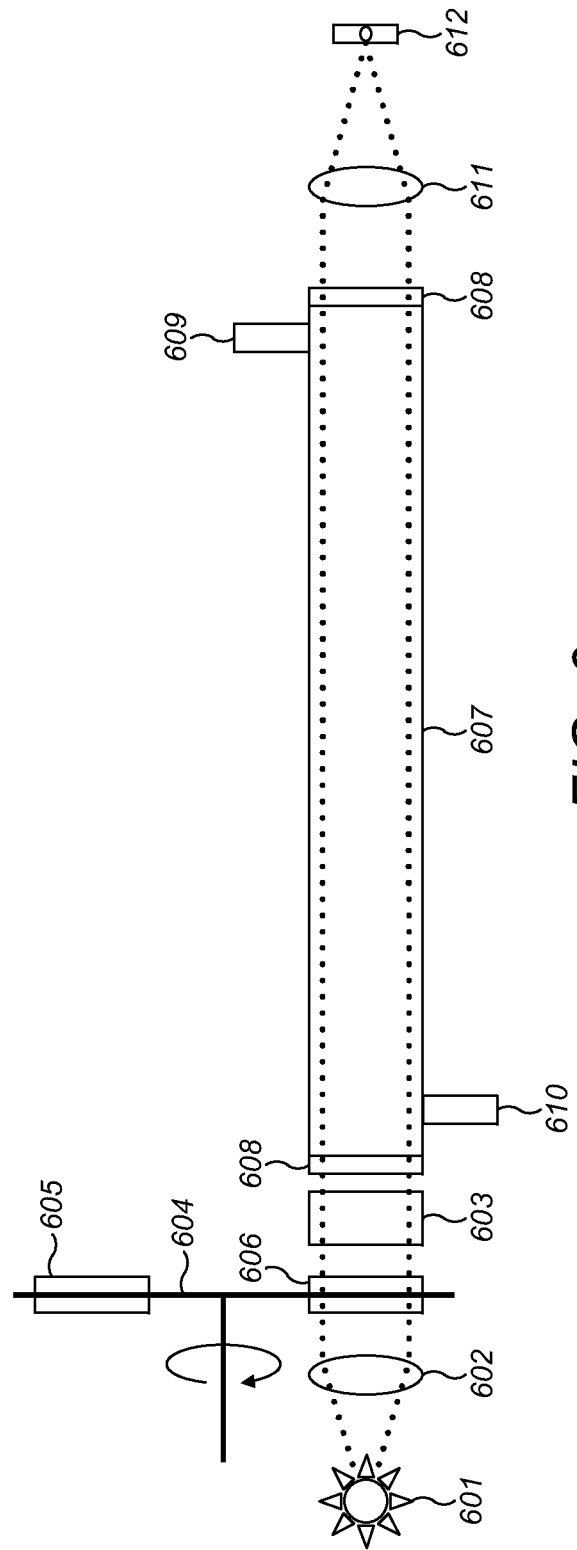
FIG. 6 is a schematic representation of a known gas filter correlation system.

The above examples were for scanned laser diode applications with a very narrow bandwidth (sub-single absorption line bandwidth), but broadband applications over multiple absorption lines are also possible, where an advantageous measurement may be made by application of a magnetic field and/or electric field. Let us consider the known measurement method of gas filter correlation (GFC). An example of a GFC is shown in FIG. 6. Parallel light from a broadband source 601, such as an incandescent source or broadband light emitting diode (LED), is passed through an optical element 602 and then through an optical passband filter 603, to narrow the wavelength bandwidth and cut down on ambient optical noise. The light is then passed through a rotating chopper wheel 604, which contains two sealed cuvettes. One of the cuvettes 605 contains an optically non-absorbing gas, such as nitrogen, which we will be referred to as the "measure" cuvette and the other cuvette 606 contains the gas of interest, such as, nitric oxide or nitrogen dioxide, which will be referred to as the "reference" cuvette. Each cuvette consists of an identical, thin cylinder or other appropriate format, sealed at either end by a window transparent to the wavelength range of interest. The partial pressure of the gas of interest and cuvette length is chosen to have at least one absorption peak within the passband range of the optical filter that is of sufficient optical density to be within the non-linear absorption range, as defined by the Beer Lambert equation. The light exiting the cuvettes is transmitted through an optical element such as a lens or window to a sealed sample cell 607, which may contain a sample gas containing the gas of interest or a calibration gas. The sample cell is sealed at the other side by optical elements 608 such as a lenses or windows, transparent to the wavelength range of interest and there is a gas inlet 609 and a gas outlet 610. The light exiting the cell is collected by a collector 611 and measured at the detector 612, which may be a pyroelectric detector, but may also be another appropriate detector such as a bolometer, thermopile, solid state photoconductive or photovoltaic optical detector or photon multiplier device. The measurement is often in the infrared range, corresponding to absorption from molecular vibrational transitions. As the wheel rotates, the detector will see alternately the signal corresponding to transmitted light exiting from the measure cuvette and sample cell $I_m$ and light from the reference cuvette and sample cell $I_r$. The reference signal may have a gain $G_0$ applied either electronically or digitally, whose value is set at calibration with nitrogen in the sample cell so that the amplified signal $G_o I_r$ equals $I_m$ with nitrogen in the cell. $I_r$ should always be less than $I_m$ (i.e. $G_o > 1$), since some of light has been pre-absorbed by the gas of interest in the reference cuvette, unless the signal path for I, has been adapted relative to $I_r$ to reduce the throughput such as by alterations to the measure cuvette transmission. When the gas of interest is in the sample cell, the measure signal will be reduced by an amount related to the concentration in the sample cell, but the reference signal will be reduced by a lesser extent, since the gas of interest in the cuvette has already some absorption corresponding to the non-linear absorption region of the Beer Lambert behaviour (i.e. approaching saturation). The signal S may be defined by:

$$S = K * \left( \frac{G_o I_r - I_m}{I_r} \right) \quad (15)$$

where K is an instrumentational factor. The measurand concentration may be derived from S. Using such a system, a very accurate measurement may be obtained with low drift and low cross interference compared to a standard, non-referenced device since, except for the cuvettes, the measure and reference paths are identical, and the same source and detector are used. The signal is divided by $I_r$ to compensate for source intensity fluctuations and/or drift. Although this is an established method, there are still potential issues, which limit performance and reliability such as: the measure and reference cuvettes will not be completely identical; there are moving parts—causing wear and tear, alignment, jitter—and negative cross interference. Negative cross interference is a direct consequence of applying the differential gain. This means that if an absorbing gas is present, which does not overlap with the gas of interest, but is within the pass band of the optical filter, there will be a resultant effect which will be equivalent to a "negative" measured concentration. This is because the measure and reference signals change by the same absolute amount, but due to the difference in gains, 1 versus $G_o$ respectively, the processed signal will be a net negative result, proportional to $-(G_o-1)$.

Figure 7:
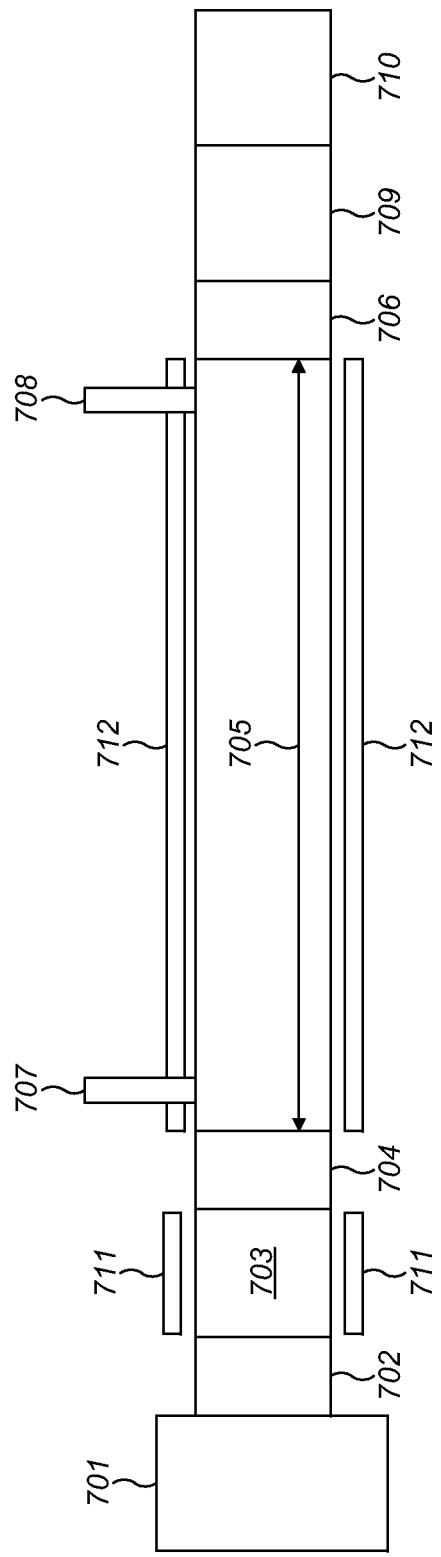
FIG. 7 shows an arrangement of a spectroscopic gas analysis system implementing the present invention.

For appropriate gases, improved performance may be obtained by applying magnetic and/or electric fields. Let us consider an example system as illustrated in FIG. 7 for an applied magnetic field, which may be suitable for gases such as nitric oxide and/or nitrogen dioxide (NO and $NO_2$). As with the GFC, there is a broadband source 701 (such as incandescent source, LED or flashlamp). The output from the source is passed though one or more optical elements 702 which may include windows, optical passband filters, reflective optics and refractive optics. This output is then passed through at least one cuvette 703 containing at least one gas of interest, which may be nitric oxide and/or nitrogen dioxide and/or other suitable gas species. A gas of interest may be a measurand gas, whose concentration is required to be determined and/or it may be an interferent to be characterised and used to compensate for any induced uncertainty in the main measurand(s) determination(s). A gas of interest may be at least one isotopomer or isotopologue of a gas species, where the concentration of one or more particular isotopomer or isotopologue is required to be determined, and they may be measured separately since different isotopomers or isotopologues of the same gas species may have different absorption characteristics in the absence and presence of magnetic fields. If more than one gas of interest is being simultaneously measured, the cuvette may be co-filled with two or more gases of interest, providing they do not chemically react with each other. Alternatively, two or more cuvettes may be used in series or parallel. The at least one cuvette may consist of a thin cylinder, sealed at either end by optical elements, which may be windows or refractive optics, transparent to the wavelength range of interest. For convenience, the cuvette could be completely sealed containing the relevant reference gas mixture, but alternative arrangements are also possible, such as having a known reference gas mixture continuously flowing through the cuvette. The partial pressure of the at least one gas of interest and cuvette length is chosen to have at least one absorption peak within the passband range of the optical filter that is of sufficient optical density to be within the non-linear absorption range, as defined by the Beer Lambert equation. The temperature of the at least one cuvette may be known and/or can be controlled for enhanced performance. The light exiting the at least one cuvette is transmitted through an optical element 704 which seals one side of a sample cell 705, which may contain a sample gas containing the at least one gas of interest or a calibration gas. The sample cell is sealed at the other side by another optical element 706 and there is a gas inlet 707 and a gas outlet 708. Both optical elements either side of the cell are transparent to the wavelength rage of interest and may include windows, reflective and refractive optics. Light exiting the cell is collected by the collector 709, which may include optical elements such as windows, lenses, optical passband filters, reflective and refractive optics and then measured by at least one appropriate detector 710, which could be a pyroelectric, thermopile, bolometer, solid state photovoltaic or photoconductive detector. Note that the location of the at least one optical pass band filter and/or at least one cuvette illustrated could be at the detector end instead of the source end and still have the same functionality. Alternative appropriate methods could also be used to select the wavelength range, such as a diffraction grating. For the case of analysing more than one gas of interest, at least two separate detectors with at least two separate wavelength selection means could be used or one detector with a manual or automated alternating wavelength range selection, such as using a piezoelectric device or rotating wheel. In this case, compared to the GFC, there is only one optical path and there are no moving parts when analysing one gas of interest or using multiple detectors. For ease of illustration, the following example will only be illustrated for one gas of interest. Let us now consider the effect of applying a varying magnetic field to the cuvette 711 and/or to the sample cell 712. The magnetic field may be formed electromagnetically, such as by using a solenoid and/or using permanent magnets, which may be moved by mechanical means such as a motor or piezo activated device. Since these techniques will result in alternating signals, frequency domain analysis, such as synchronous detection, (Fast) Fourier Transforms, harmonic analysis and amplitude modulation analysis may be used to obtain enhanced sensitivity.

Firstly, we will examine the situation if a magnetic field is applied to the cuvette. As the magnetic field is switched off and on, the detector will see alternately the signal corresponding to transmitted light exiting from the "gas of interest" cuvette with no magnetic field and sample cell $I_r$ and light from the "measure" cuvette with magnetic field, where one or more gas of interest lines are split by the magnetic field and the sample cell $I_m$. Therefore, the measure and reference are optically identical light paths, other than the absorption line splitting due to the presence of the magnetic field. For convenience, the reference signal may have a gain $G_0$ applied either electronically or digitally, whose value is set at calibration with nitrogen in the sample cell so that the amplified signal $G_o I_r$ equals $I_m$ with nitrogen in the cell. Note that the value of $G_o$ will be different from the traditional GFC measurement, since absorption is still occurring in the split absorption lines. When the gas of interest is in the sample cell, the measure signal will be reduced by an amount related to the concentration in the sample cell, but the reference signal will be reduced by to a lesser extent, since the gas of interest has some absorption corresponding to the non-linear absorption region of the Beer Lambert behaviour (i.e., approaching saturation) due to the cuvette. The signal S may be defined by:

$$S = K_i * \left( \frac{G_o I_r - I_m}{I_r} \right) \tag{16}$$

$K_i$ is an instrumentational factor. The signal is divided by $I_r$ to compensate for source intensity fluctuations or drift. The concentration C of the measurand gas may be derived from the magnitude of S, for example by using a polynomial:

$$[C] = K_m * (a_1 S + a_2 S^2 + a_3 S^3 + \ldots) \quad (17)$$

$K_m$ is the calibration proportionality constant and the $a_i$ terms are the associated polynomial power term constants. Other appropriate mathematical equations may be used to derive the measurand gas concentration such as using a power term or an exponential fit.

Using such a system, a very accurate measurement may be obtained with improved drift characteristics. Since there are no moving parts, longevity and reliability should also be improved.

If cross interference is induced by differential gain $G_o$ and/or by the split lines caused by the presence of the magnetic field overlapping with a background cross interferer's absorption line(s), this can be compensated for by using two or more magnetic field strengths to modulate the extent of the splitting occurring. These detected intensities corresponding to these two or more different field strengths can then be used in the form of simultaneous equations or other appropriate methods to detect that cross interference is occurring and correct for this.

This can be illustrated by considering the following:

$$S_1 = K_1 * \left( \frac{G_{o1} I_r - I_{m1}}{I_r} \right) \quad (18)$$

the subscript 1 corresponds to the case where a first magnetic field strength is applied and $$S_2 = K_2 * \left( \frac{G_{o2} I_r - I_{m2}}{I_r} \right) \quad (19)$$

the subscript 2 corresponds to the case where a second magnetic field strength is applied. These in turn may be used to derive the measurand gas concentration, such as by using polynomial equations or other appropriate means such that:

$$[C_1] = K_{m1} * (a_{11} S_1 + a_{12} S_1^2 + a_{13} S_1^3 + \ldots) \quad (20)$$

and $$[C_2] = K_{m2} * (a_{21} S_2 + a_{22} S_2^2 + a_{23} S_2^3 + \ldots) \quad (21)$$

where the lower case denotes the presence of the two different magnetic field strengths. For a calibrated system, where no cross interference is present, the calculated values for $C_1$ and $C_2$ should be identical. i.e., for no cross interference: $[C_1] - [C_2] = 0$, whilst when cross interference is present:

$$[C_1] - [C_2] = \Delta \quad (22)$$

here $\Delta$ is the difference between the two calculated concentration values. The value of $\Delta$ will be related to the cross-interferer's concentration, hence a calibrated correction may be applied and/or the cross interferer's concentration may also be determined, for example by using a polynomial:

$$[C_I] = K_I * (b_1 \Delta + b_2 \Delta^2 + b_3 \Delta^3 + \ldots) \quad (23)$$

$$[C_C] = [C_1] + K_C * (d_1 [C_I] + d_2 [C_I^2] + d_3 [C_I^3] + \ldots) \quad (24)$$

$K_C$ is the calibration correction proportionality constant and the $d_i$ terms are the associated polynomial power term constants. Other appropriate mathematical equations may be used to derive the corrected concentration such as using a power term or an exponential fit.

If more than one cross interferer is present, then more magnetic field strengths can be applied to enable a compensation algorithm to be defined.

Alternatively, the cross-interference effect may be negated by adding the cross interferer(s) as a background gas(es) to the gas of interest cuvette or as a filling to a secondary cuvette in the light path to minimise the effect of the presence of the cross interferer(s) in the sample gas, by absorbing radiation corresponding to the wavelengths of the cross interferer.

A similar detection and/or correction method could be used for temperature and/or line broadening (pressure or collisional), since the effects of these on the absorption lines with and without the presence of a magnetic field may be different. If, for example, the temperature and pressure were determined independently and corrected for, the presence of collisional broadening due to a background gas could also be compensated for.

Note that another version of the above is possible, where the sample cell has the magnetic field applied on or off instead of the gas of interest cuvette. In this case, in the absence of the gas of interest in the sample cell, the detector signal looks the same, i.e., ideally $G_o = 1$. When the gas of interest is present in the sample cell with the magnetic field off, little change is seen in the detector signal, since the absorption in the cuvette is so strong. However, when the gas of interest is present in the sample cell in the presence of a magnetic field, extra absorption will now occur, since the split lines of the sample gas are distinct from those in the cuvette. This has similar advantages of no moving parts and very good common mode rejection.

A hybrid version is also possible, where magnetic fields may be applied independently over both the sample cell and cuvette and the concentrations measured using the above methods compared with each other for the detection and correction of non-common mode effects, such as cross interference.

Note that although the above-described examples in this patent specification have been illustrated for gases using magnetic fields, these could also be used with any appropriate gas or gases and also with electric fields (for example, with ammonia or water) instead of magnetic fields, or a combination of electric and magnetic fields may be used. The term "appropriate gas" here refers to a gas for whom at least one spectral absorption line within the wavelength range of interest has the degeneracy of the absorption lifted in the presence of a magnetic and/or electric field, such that splitting out of the absorption line(s) is possible and can assist with analysis of absorption features that would be less visible in the absence of magnetic and/or electric fields.

Another example method, for use in an absorption spectroscopy system, enables measurement of a change in transmission at one or more wavelengths, as a function of applied field strength or as a function of polarisation of an electromagnetic radiation source relative to the applied field, to determine a property of specific isotopologues or isotopomers of a measurand species, such as to determine pressure, temperature or concentration.

A measurand gas species can be comprised of sets of elements with differing isotopic masses, such that the spectra arising from a single chemical species may be comprised of multiple, distinct spectra from different isotopologues and/or isotopomers. For some specialised applications, it is useful to detect isotopic composition, to determine, for example, whether a measurand species originates from a biogenic source or from a particular geographical location or historical era. The differences in spectra arising from different isotopologues are dependent on the mass differences of the isotopes involved in associated vibrational modes. Similarly, the profile of the splitting of energy levels that occurs with respect to applied fields varies slightly between different isotopologues and/or isotopomers[15]. Where a spectral transition arising from isotopologues and/or isotopomers overlap, and cannot be identified uniquely in the absence of a field, the relative contribution of the different species may be elucidated by monitoring the splitting of the line(s) at one or more wavelengths, with respect to an applied field.

Figure 12:
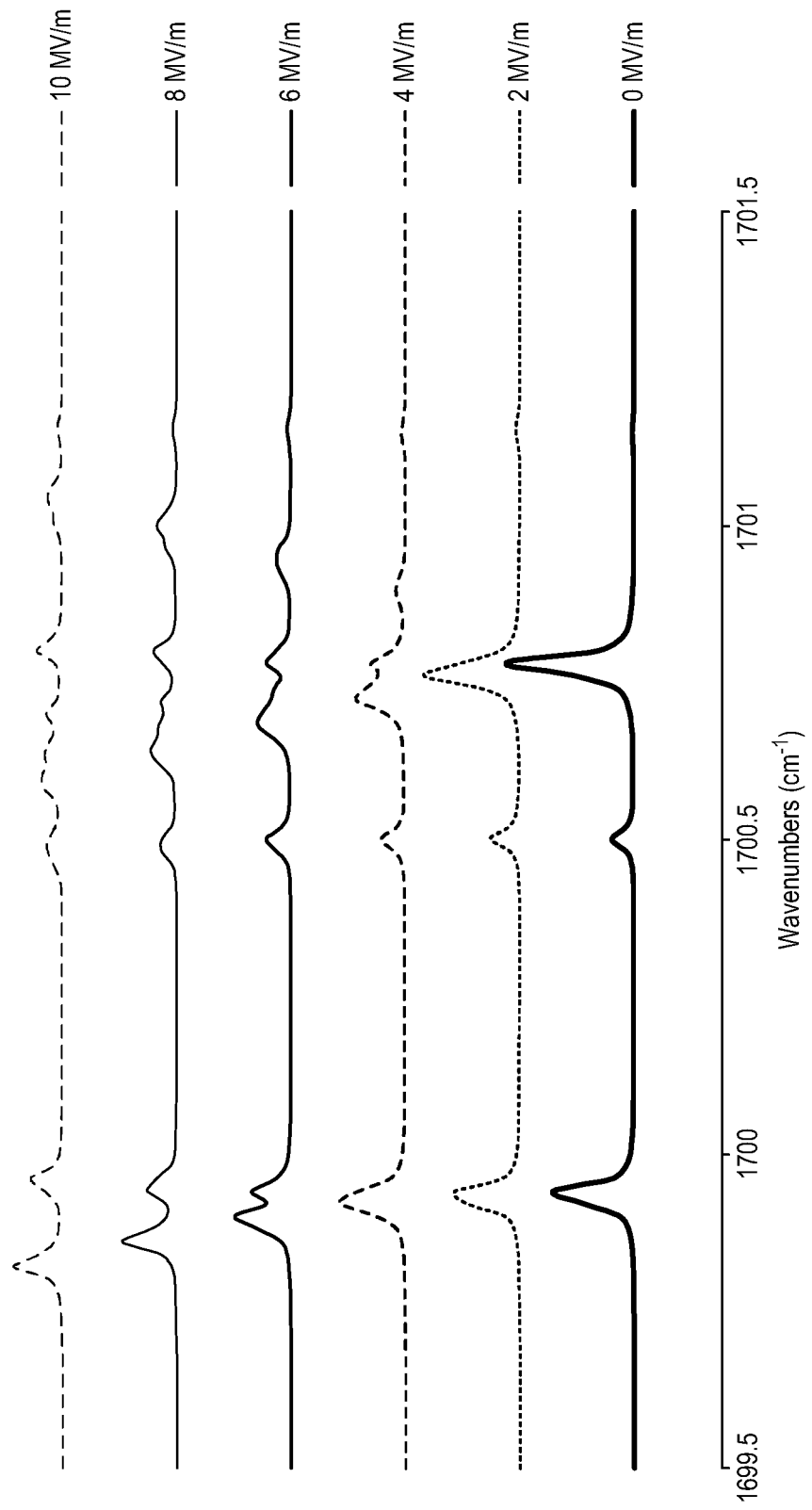
FIG. 12 shows the splitting of some representative water absorption lines as a function of applied electric field.

If we now consider the influence of an electric field applied to the sample cell (712) or the cuvette (711), the effect will be different to a magnetic field since the molecule's electric dipole will be perturbed. This in turn changes the electric dipole moment responsible for virtually all infrared transitions. It follows that changing the electric field around a molecule will change its net preponderance to absorb light, as well as splitting its individual energy levels. The modulation could take many formats, such as square wave, sinusoidal or other arbitrary form with modulating and potentially steady state components. In FIG. 12, the splitting of some water absorption lines is shown as a function of applied electric field. Some lines are split to a greater extent due to the particularities of the quantum states involved. It follows that the spectral overlap between a sample spectrum (at zero field) and a spectrum obtained at an elevated electrical potential will have a complex, non-linear, non-monotonic dependence on the applied field strength.

Figure 13:
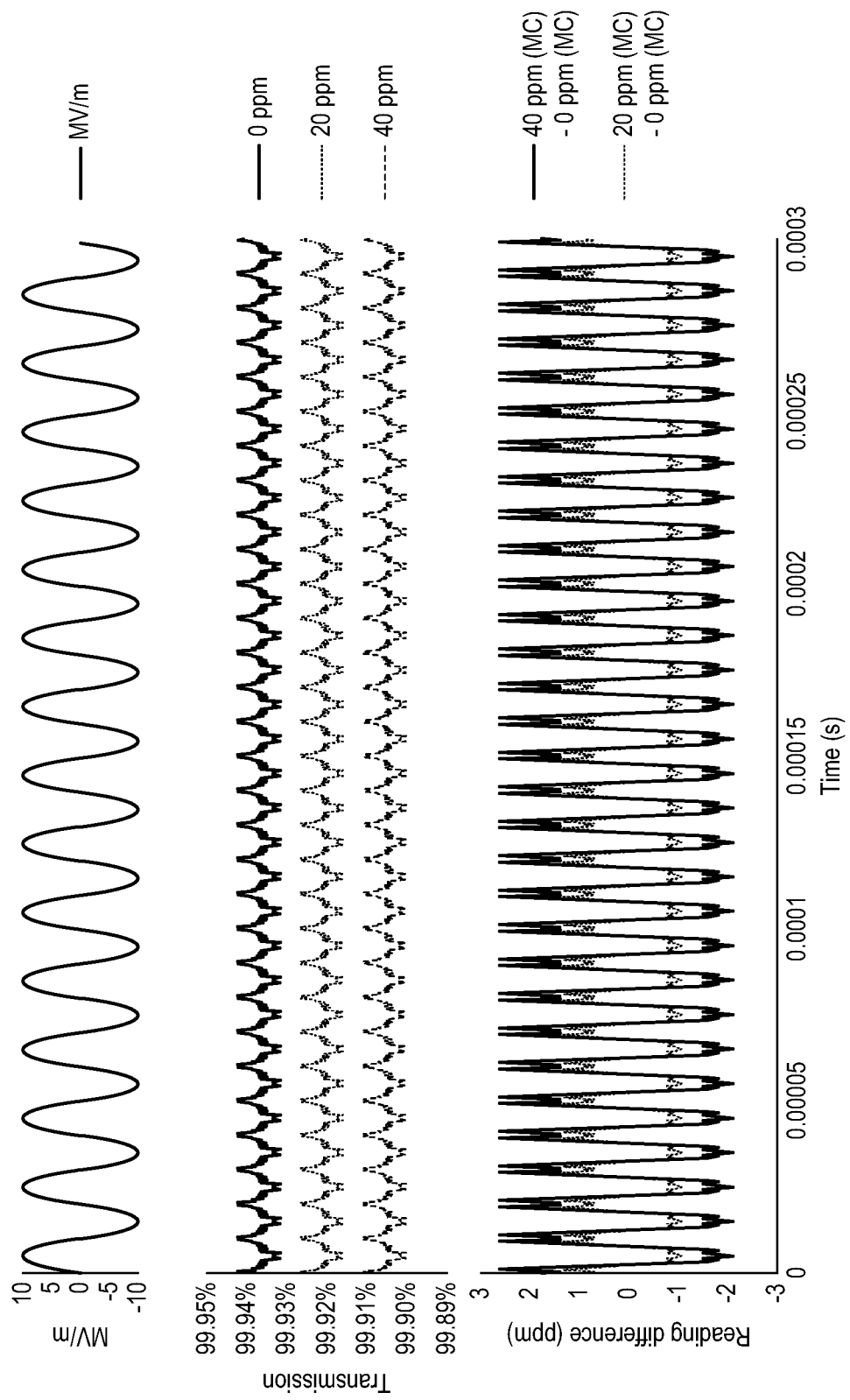
FIG. 13 shows an applied field (top), intensity of light received at a detector as a function of time and sample cell $H_2O$ concentration (middle) and mean-centered (MC) signals at 20 and 40 ppm $H_2O$ sample concentration after subtracting the 0 ppm MC signal (bottom).

This complex behaviour is also presented in FIG. 13 which shows the effect of applying an electric field to a 1 cm long cuvette containing 1% water at 0.1 atm. at 296K, with the field sinusoidally modulated between −10 and 10 MV/m at 50 kHz. Light is passed through this cuvette (711) and then through a 1 m sample cell (712) that is field free, to an infrared detector (710).

Figure 14:
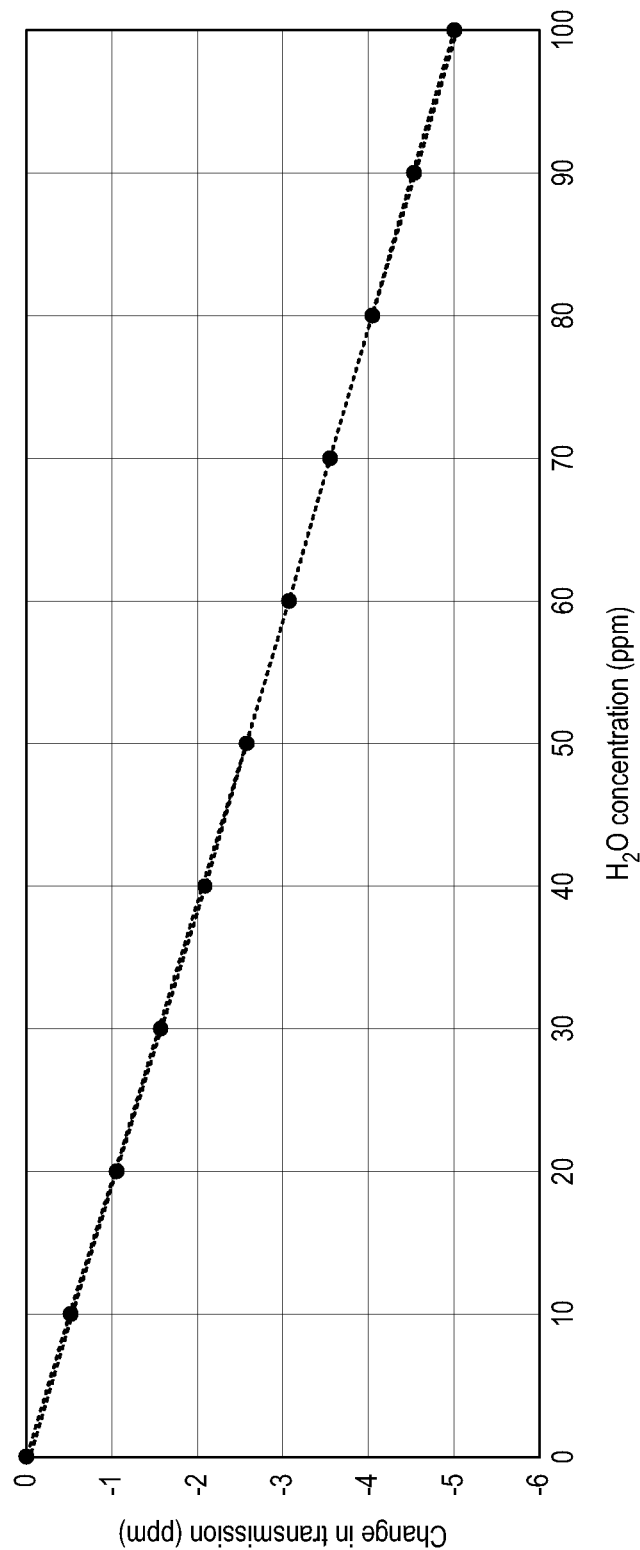
FIG. 14 shows the difference in transmission at zero-field and 10 MV/m field conditions as a function of sample $H_2O$ concentration.

The total transmission through such a system is primarily modulated at 100 kHz, i.e., at twice the excitation frequency (2 f), since the Stark effect is dependent on the magnitude, rather than the sign, of the applied field, despite having no gas present in the sample region (712). The signal may be interpreted in the time or frequency domains, but the modulation of the desired signal at twice the excitation frequency signifies that frequency based detection means, such as synchronous detection or Fourier transform techniques, will have the advantage of separation of the desired signal from the signal associated with the primary excitation frequency and hence enhanced signal to noise ratio. Upon addition of 20 and 40 ppm water to the sample cell the 2 f (and other harmonics) modulation remains, but the overall transmission of light to the detector (710) is decreased owing to additional absorption of light by the measurand gas. By subtracting the mean-centred signal obtained where there is 0 ppm water in 712, from those obtained where there is at 20 and 40 ppm, it becomes clear that the differences in their modulated signals are proportional to the sample water concentration. The difference between the (mean-centred) signals obtained at 0 MV/m and 10 MV/m are plotted as a function of $H_2O$ concentration in FIG. 14, demonstrating the ease at which the concentration of water in 712 can be determined by this approach.

It is worth emphasising that the resulting signals may be normalised by the DC offset required to mean-centre the traces, to minimise the influence of source and detector fluctuations described earlier. As an alternative to the aforementioned normalisation, one may split the beam exiting the cuvette and pass the signal to a separate detector. Thus, one may normalise the signal received at 710 without solely relying on the DC offset at the detector. The disadvantage of this approach is that, without the DC offset signal, normalisation of changes in intensity through the sample cell caused by, for example, shifts in alignment, are more difficult to achieve. On the other hand, splitting the beam in this way allows the concentration of the gas in the cuvette to be independently determined, thus giving warning of leaks or otherwise problematic systemic changes to the optical arrangement that may influence the measurement.

Figure 15:
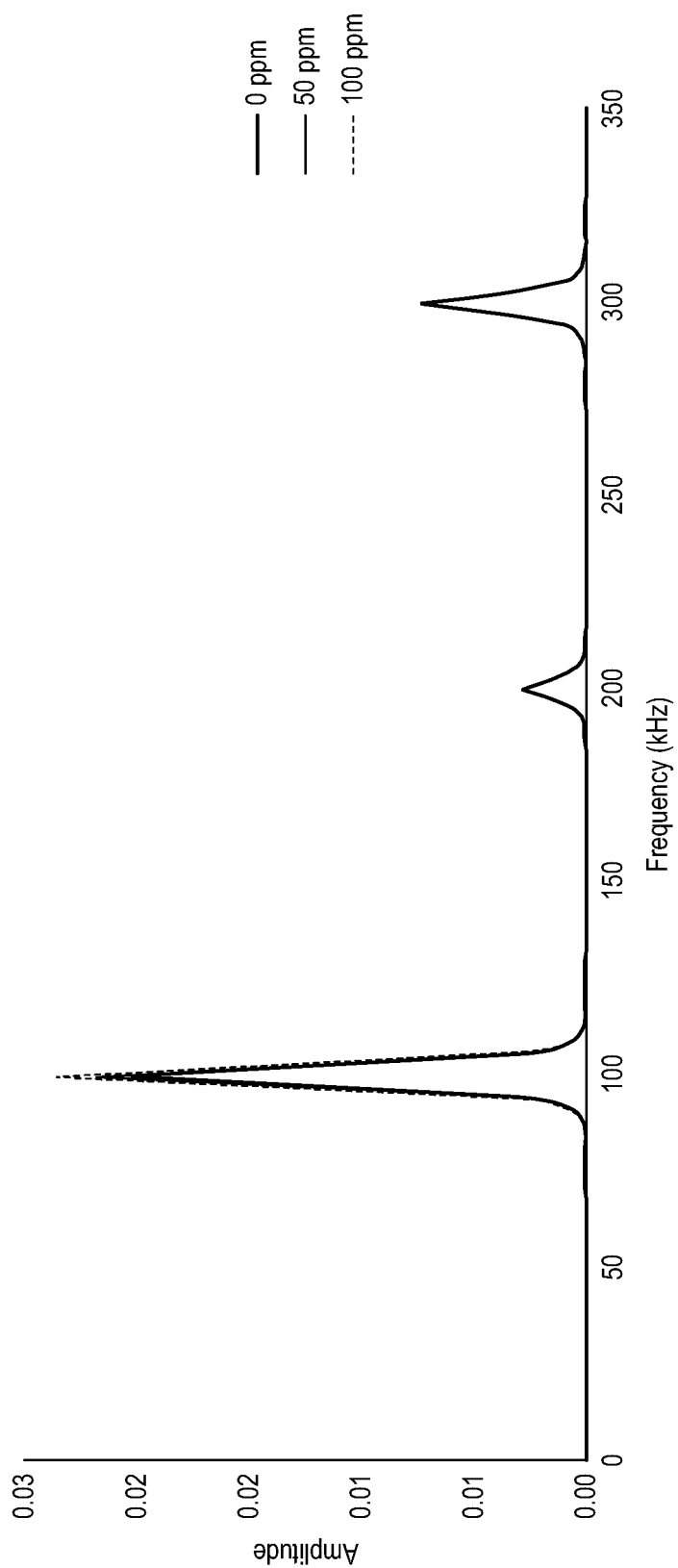
FIG. 15 shows the frequency spectrum generated by applying an FFT to the traces shown in FIG. 13.
Figure 16:
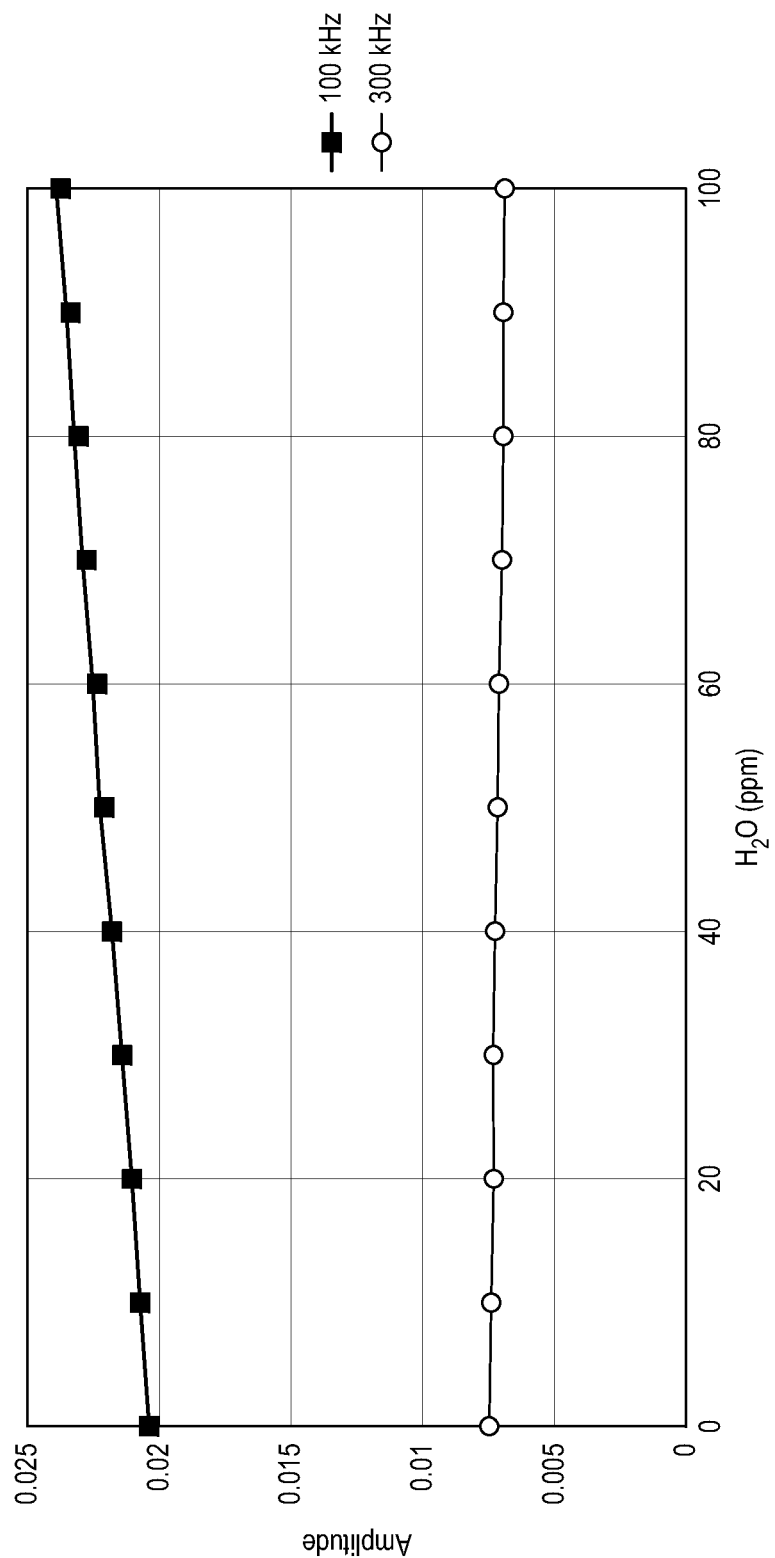
FIG. 16 shows the dependence of the 2 F and 6 F frequency components, shown in FIG. 15, to sample $H_2O$ concentration.

From FIGS. 12 and 13, it is shown that the influence of an oscillating electric field on cell transmission is non-linear and complex, particularly when the absorption of a sample gas is considered. Perturbations to the resulting waveform, arising from changes in the gross overlap between the sample and cuvette absorption lines, can be conveniently extracted in a continuous fashion by recording the frequency spectrum of the resulting detector signal. In a live measurement system, to enable a streaming measurement, it is possible to perform a "rolling FFT" on a tapered cosine (Tukey) time windowed, mean-centred portion of the detector output stream. The result of applying such a scheme to the traces shown in FIG. 13 is shown in FIG. 15. Different frequency components increase or decrease in magnitude as the concentration of $H_2O$ in the sample cell is increased from zero to 100 ppm (as shown in FIG. 16). The magnitude of the 100 kHz (2 f) frequency peak, generated by such a scheme, increases by around 20%, compared to the 0 ppm $H_2O$ measurement, for every 100 ppm of water added to a 1 m sample cell (at STP), whereas the 300 kHz signal (6f) decreases by around 10%.

Note that, since the total integrated absorption and hence transmission signal may be affected by the presence of electric and/or magnetic fields, a modulated signal will be seen if the field is modulated with respect to time, even without the presence of a cuvette. This could mean that, for example, a very simple spectroscopic apparatus may consist of a steady state source transmitting light across a defined wavelength range (for example via the presence of an optical band pass filter) into a sample cell across which an electric and/or magnetic field is modulated and the transmitted light through the sample cell is detected by an optical detector. As discussed above, the electric field may have a profound effect upon the electric dipole and hence the integrated absorption cross section, but even a magnetic field may affect modulation at high concentrations, since the Beer Lambert non-linearities for the degenerate (no field) and non-degenerate states (with field applied) will not be the same. This type of arrangement can provide advantages, in certain cases, over lasers, where a low cost sensor may be made using very strong fundamental absorption wavelengths, which would otherwise involve high-cost lasers; such an arrangement can also provide advantages over current broad band sensors, since these would typically use dual wavelength detection to minimise the effect of source output fluctuations, either with two separate detectors or a rotating wheel containing two distinct pass band filters. In this case, for example, the sensor could be solid state, or using rotating permanent magnets, but outside the optical path. Fluctuations in the source intensity could be compensated for by normalising the output magnitude, for example, from the steady state signal or via a secondary detector and looking at the fractional change between the two signals to indicate the measurand concentration.

The following examples are provided. The features of these various examples can be combined.

A first example method for gas detection and/or measurement in an absorption spectroscopy system comprises: transmitting electromagnetic radiation from at least one source of electromagnetic radiation, through a gas sample towards at least one detector; applying at least one of an electric, magnetic or electromagnetic field to at least one section of a transmission path of the electromagnetic radiation that is transmitted between the at least one source and at least one detector; using the at least one detector to monitor absorption of electromagnetic radiation for at least one absorption wavelength or wavelength range associated with at least one gas species, by detecting transmitted electromagnetic radiation that is not absorbed; and analysing an output signal from the at least one detector to determine the presence and/or measure a parameter of at least one gas species within the gas sample.

In the first example, a method may comprise applying different respective field modulations to a plurality of different sections of the transmission path of the electromagnetic radiation. In the first example, the at least one electric, magnetic and/or electromagnetic field may be unchanging with respect to time. Alternatively, at least one electric, magnetic and/or electromagnetic field is varied with respect to time—for example at least one electric, magnetic and/or electromagnetic field is modulated with a fixed frequency, or at least one electric, magnetic and/or electromagnetic field is modulated with a variable frequency. In an example method, a combination of unchanging and changing fields are applied.

In the first example, a method may include analysing the effect of a changing field on an output signal from the at least one detector, to identify and isolate a spectral artifact from the absorption spectrum of at least one gas species. In an example, the identified spectral artifact is a result of absorption by an interferent or noise, and the method comprises suppressing the absorption spectral artifact for improved detection and/or measurement.

In the first example, a method may comprise analysing an output signal from a detector in the presence of an applied field and in the absence of the applied field, and calculating a difference between the two output signals.

In an example method, at least one electric, magnetic or electromagnetic field is applied to a first section of the transmission path of the electromagnetic radiation, to shift the quantum energy state transitions of at least one gas species within the first section, thereby to modulate spectroscopic absorption by the at least one gas species within the first section; and wherein at least a second electric, magnetic or electromagnetic field is applied to a second section of the transmission path of the electromagnetic radiation, wherein the first and second fields differ from each other so as to differently modulate spectroscopic absorption by at least one gas species within the first and second sections.

In an example method, a measured parameter is concentration of at least one gas species.

In an example, the method comprises: applying a purge gas to a section of an absorption spectroscopy system, prior to applying an electric, magnetic or electromagnetic field; controlling quantum energy state transitions of at least one gas species within the purge gas, by applying at least one electric, magnetic or electromagnetic field to a purged section of the transmission path of the electromagnetic radiation, thereby to suppress or modulate a spectral artifact resulting from absorption by the at least one gas species within the purge gas. In one example, the purge gas is air and the at least one gas species to be detected and/or measured is oxygen.

In an example, the method comprises selection of at least one electromagnetic radiation wavelength or wavelength range of transmitted electromagnetic radiation by one or more of the following: tuning a solid state laser by controlling the laser temperature and/or drive current, or using an optical band pass filter, a diffraction grating or spectrometer.

In an example, at least one electric field is generated by a voltage gradient between at least two electrodes. In another example, at least one magnetic field is generated by one or more permanent magnets. In another example, at least one magnetic field is generated by the passage of charge carriers, such as electrons within a solenoid.

In an example, at least one polariser is used to polarise or to filter electromagnetic radiation within a particular plane. An example method comprises applying a field in each of a plurality of different applied field orientations with respect to the polarisation, for at least one section of the transmission path of the electromagnetic radiation. An example method comprises applying fields with different orientations with respect to the polarisation, for a plurality of different sections of the transmission path of the electromagnetic radiation. An example method comprises splitting the electromagnetic radiation into a plurality of differently polarised portions using at least one polariser, and directing the plurality of differently polarised portions of electromagnetic radiation through the gas sample, in the presence of the applied at least one field, for detection by one or more detectors. In an example method, the at least one polariser comprises an optical element having an adjustable orientation, for selective polarisation of incident electromagnetic radiation with respect to an applied electric, magnetic, or electromagnetic field. In an example, the polarisation comprises partial reflection by the optical element and wherein a first portion of electromagnetic radiation is transmitted along a first optical path and a second portion of electromagnetic radiation is reflected from the optical element and redirected to pass through a second optical path, and the two portions of electromagnetic radiation are detected simultaneously by a single detector or by a plurality or detectors.

In an example method, the gas sample is contained within a sample chamber that has at least one gas inlet and at least one gas outlet and wherein one or more optical elements in a wall of the sample chamber allow the transmission of relevant electromagnetic radiation wavelengths in and out of the sample chamber.

In an example method, the application of at least one magnetic, electric or electromagnetic field is used to verify a laser lock line and/or for calibration.

An example method comprises determining the pathlength of an absorption spectroscopy system by measuring a ratio of first and second detector output signals, wherein a first signal is obtained by transmission of electromagnetic radiation through a gas sample within an electric, magnetic or electromagnetic field, and wherein a second signal is obtained by transmission of electromagnetic radiation through the gas sample in the absence of the electric, magnetic or electromagnetic field, or after the field is varied either spatially and/or temporally, to facilitate accurate scaling of absorption when making a measurand measurement.

An example apparatus for use in gas detection and/or measurement comprises: at least one electromagnetic radiation source for transmitting electromagnetic radiation through a gas sample towards at least one detector; at least one detector for monitoring absorption of electromagnetic radiation for at least one absorption wavelength or wavelength range associated with a gas species, by detecting transmitted electromagnetic radiation that is not absorbed; at least one field generator arranged to apply at least one of an electric, magnetic or electromagnetic field to at least one section of a transmission path of the transmitted electromagnetic radiation between the at least one source and at least one detector; and a signal processor for analysing an output signal from the at least one detector to determine the presence of or measure a parameter of at least one gas species within the gas sample.

An example apparatus comprises a sample chamber for containing the gas sample, which sample chamber has at least one gas inlet and at least one gas outlet and one or more optical elements in a wall of the sample chamber, wherein the optical elements allow the transmission of relevant electromagnetic radiation wavelengths in and out of the sample chamber.

In an example apparatus, the one or more optical elements include one or more of: windows, lenses or pass band filters.

In an example apparatus, at least one field generator is arranged to apply at least one magnetic, electric and/or electromagnetic field across the sample chamber.

An example apparatus comprises at least one gas-purged section of the apparatus, in the transmission path of the electromagnetic radiation, wherein a field generator is arranged to apply at least one magnetic, electric and/or electromagnetic field across the gas-purged section of the apparatus.

An example apparatus comprises a sample chamber and a reference cuvette, the reference cuvette containing one or more known gas species, with at least one said gas species being a gas species to be analysed, wherein the sample chamber is arranged to receive a gas sample to be analysed and at least one field generator is arranged to apply at least one magnetic, electric and/or electromagnetic field across the cuvette and/or sample chamber.

In an example apparatus, the reference cuvette contains at least one isotopomer or isotopologue of a gas species.

In an example apparatus, at least one detector is arranged to detect electromagnetic radiation transmitted through the sample chamber and at least one reference cuvette, where at least one magnetic, electric or electromagnetic field is applied to the cuvette and/or sample cell and the signal processor is arranged for analysing output signals from the at least one detector to compare absorption by one or more gas species and/or one or more gas species isotopomer or isotopologue.

In an example apparatus, the at least one field generator is configured to apply at least two different magnetic and/or electric field strengths to at least one section of the transmission path and the signal processor is configured to generate a comparison signal using output signals from the at least one detector obtained using the at least two field strengths.

In an example apparatus, the source of electromagnetic radiation is a solid-state diode laser, whose output wavelength is tuneable by control of its temperature and/or current, and wherein the detector is a solid-state photodiode.

In an example apparatus, the signal processor is configured to correct for the effect of optical interference by analysing first signals with and second signals without the application of magnetic, electric or electromagnetic fields.

In an example apparatus, the at least one electromagnetic radiation source is one of a laser, a light emitting diode, an incandescent element or a flash lamp.

In an example apparatus, the at least one detector is one of a solid-state a photodiode, a photomultiplier tube, a mercury cadmium telluride (MCT) detector, a bolometer, a pyrometer or a thermopile.

In an example, an absorption spectroscopy system for use in gas detection and/or measurement, comprises: a sample chamber for containing a gas sample, which sample chamber has at least one gas inlet and at least one gas outlet and one or more optical elements in a wall of the sample chamber, wherein the optical elements allow the transmission of electromagnetic radiation in and out of the sample chamber; at least one electromagnetic radiation source arranged for transmitting electromagnetic radiation through a gas sample towards at least one detector; at least one detector for monitoring absorption of electromagnetic radiation for at least one absorption wavelength or wavelength range associated with a gas species, by detecting transmitted electromagnetic radiation that is not absorbed; at least one field generator arranged to apply at least one of an electric, magnetic or electromagnetic field to at least one section of a transmission path of the transmitted electromagnetic radiation between the at least one source and at least one detector; and a signal processor for analysing at least one output signal from the at least one detector to determine the presence of or measure a parameter of at least one gas species within the gas sample.

An example absorption spectroscopy system comprises means for measuring a change in transmission through a gas sample of electromagnetic radiation at one or more wavelengths, as a function of applied field strength or as a function of polarisation of an electromagnetic radiation source relative to the applied field, to determine a property of specific gas species and/or isotopologues or isotopomers of a measurand species, such as to determine pressure, temperature or concentration.

An example method, for use in an absorption spectroscopy system, comprises measuring a change in transmission through a gas sample of electromagnetic radiation at one or more wavelengths, as a function of applied field strength or as a function of polarisation of an electromagnetic radiation source relative to the applied field, to determine a property of specific gas species and/or isotopologues or isotopomers of a measurand species, such as to determine pressure, temperature or concentration.

What is claimed is:

1. A method for gas detection and/or measurement in an absorption spectroscopy system, comprising:
    transmitting electromagnetic radiation from at least one source of electromagnetic radiation, along a transmission path through a gas sample in a measurement volume of an absorption spectroscopy system, towards at least one detector;
    flowing a purge gas to at least a first section of the absorption spectroscopy system, which gas-purged first section is isolated from the measurement volume but is within the transmission path of the electromagnetic radiation that is transmitted between the at least one source and at least one detector;
    applying at least one of an electric, magnetic or electromagnetic field to at least the gas-purged first section of the absorption spectroscopy system, thereby to suppress or modulate a spectral artefact resulting from absorption by at least one gas species within the purge gas;
    using the at least one detector to monitor absorption of electromagnetic radiation by the gas sample in the measurement volume, for at least one absorption wavelength or a wavelength range including one or more absorption wavelengths associated with at least one gas species, by detecting transmitted electromagnetic radiation that is not absorbed; and analysing an output signal from the at least one detector to determine the presence and/or measure a parameter of at least one gas species within the gas sample.

2. The method according to claim 1, further comprising applying different respective fields to a plurality of different sections of the absorption spectroscopy system along the transmission path of the electromagnetic radiation, to modulate absorption differently in the different sections.

3. The method according to claim 2 further comprising, in addition to applying a field to at least one section of the system which is isolated from the gas sample, applying at least one of an electric, magnetic or electromagnetic field to a sample chamber for containing the gas sample.

4. The method according to claim 1, wherein at least one electric, magnetic and/or electromagnetic field is unchanging with respect to time.

5. The method according to claim 1, wherein at least one electric, magnetic and/or electromagnetic field is varied with respect to time.

6. The method according to claim 5, wherein at least one electric, magnetic and/or electromagnetic field is modulated with a fixed frequency.

7. The method according to claim 5, wherein at least one electric, magnetic and/or electromagnetic field is modulated with a variable frequency.

8. The method according to claim 5, wherein a combination of unchanging and changing fields are applied.

9. The method according to claim 5, including analysing the effect of a changing field on an output signal from the at least one detector, to identify and isolate a spectral artifact from the absorption spectrum of at least one gas species.

10. The method according to claim 9, wherein the identified spectral artifact is a result of absorption by an interferent or noise, and the method comprises suppressing the absorption spectral artifact for improved detection and/or measurement.

11. The method according to claim 5, further comprising analysing an output signal from a detector in the presence of an applied field and in the absence of the applied field, and calculating a difference between the two output signals.

12. The method according to claim 1,
wherein at least a second electric, magnetic or electromagnetic field is applied to a second section of the transmission path of the electromagnetic radiation, wherein the first and second fields differ from each other so as to differently modulate spectroscopic absorption by at least one gas species within the first and second sections.

13. The method according to claim 1, wherein a measured parameter is concentration of at least one gas species.

14. The method according to claim 1, wherein the purge gas is air and the at least one gas species to be detected and/or measured is oxygen.

15. The method according to claim 1, further comprising selection of at least one electromagnetic radiation wavelength or wavelength range of transmitted electromagnetic radiation by one or more of the following: tuning a solid state laser by controlling the laser temperature and/or drive current, or using an optical band pass filter, a diffraction grating or spectrometer.

16. The method according to claim 1, wherein at least one electric field is generated by a voltage gradient between at least two electrodes.

17. The method according to claim 1, wherein at least one magnetic field is generated by one or more permanent magnets.

18. The method according to claim 1, wherein at least one magnetic field is generated by the passage of charge carriers, such as electrons within a solenoid.

19. The method according to claim 1, wherein at least one polariser is used to polarise or to filter electromagnetic radiation within a particular plane.

20. The method according to claim 19, further comprising applying a field in each of a plurality of different applied field orientations with respect to the polarisation, for at least one section of the transmission path of the electromagnetic radiation.

21. The method according to claim 19, further comprising applying fields with different orientations with respect to the polarisation, for a plurality of different sections of the transmission path of the electromagnetic radiation.

22. The method according to claim 19, further comprising splitting the electromagnetic radiation into a plurality of differently polarised portions using at least one polariser, and directing the plurality of differently polarised portions of electromagnetic radiation through the gas sample, in the presence of the applied at least one field, for detection by one or more detectors.

23. The method according to claim 19, wherein the at least one polariser comprises an optical element having an adjustable orientation, for selective polarisation of incident electromagnetic radiation with respect to an applied electric, magnetic, or electromagnetic field.

24. The method according to claim 23, wherein the polarisation comprises partial reflection by the optical element and wherein a first portion of electromagnetic radiation is transmitted along a first optical path and a second portion of electromagnetic radiation is reflected from the optical element and redirected to pass through a second optical path, and the two portions of electromagnetic radiation are detected simultaneously by a single detector or by a plurality of detectors.

25. The method according to claim 1, wherein the gas sample is contained within a sample chamber that has at least one gas inlet and at least one gas outlet and wherein one or more optical elements in a wall of the sample chamber allow the transmission of relevant electromagnetic radiation wavelengths in and out of the sample chamber.

26. The method according to claim 1, wherein the application of at least one magnetic, electric or electromagnetic field is used to verify a laser lock line and/or for calibration.

27. The method according to claim 1, further comprising determining the pathlength of an absorption spectroscopy system by measuring a ratio of first and second detector output signals, wherein a first signal is obtained by transmission of electromagnetic radiation through a gas sample within an electric, magnetic or electromagnetic field, and wherein a second signal is obtained by transmission of electromagnetic radiation through the gas sample in the absence of the electric, magnetic or electromagnetic field, or after the field is varied either spatially and/or temporally, to facilitate accurate scaling of absorption when making a measurand measurement.

28. An apparatus for use in gas detection and/or measurement, comprising:
a sample chamber for receiving a gas sample;
at least one electromagnetic radiation source for transmitting electromagnetic radiation along a transmission path through the sample chamber towards at least one detector;

at least a first gas-purged section of the apparatus that is connected to a source of purge gas, which first gas-purged section is isolated from the sample chamber but is within the transmission path of the transmitted electromagnetic radiation;

at least one detector for monitoring absorption of electromagnetic radiation by the gas sample in the sample chamber, for at least one absorption wavelength or a wavelength range including one or more absorption wavelengths associated with a gas species, by detecting transmitted electromagnetic radiation that is not absorbed;

at least one field generator arranged to apply at least one of an electric, magnetic or electromagnetic field to at least the first gas-purged section of the apparatus that is isolated from the sample chamber but is within the transmission path of the transmitted electromagnetic radiation between the at least one source and at least one detector; and a signal processor for analysing an output signal from the at least one detector to determine the presence of or measure a parameter of at least one gas species within the gas sample.

29. The apparatus according to claim 28, wherein the a sample chamber comprises at least one gas inlet and at least one gas outlet and one or more optical elements in a wall of the sample chamber, wherein the optical elements allow the transmission of relevant electromagnetic radiation wavelengths in and out of the sample chamber.

30. The apparatus according to claim 29, wherein the one or more optical elements include one or more of: windows, lenses or pass band filters.

31. The apparatus according to claim 29, further comprising at least a second field generator arranged to apply at least one magnetic, electric and/or electromagnetic field across the sample chamber.

32. The apparatus according to claim 29, further comprising a reference cuvette, the reference cuvette containing one or more known gas species, with at least one said gas species being a gas species to be analysed, wherein the sample chamber is arranged to receive a gas sample to be analysed and at least one field generator is arranged to apply at least one magnetic, electric and/or electromagnetic field across the cuvette and/or sample chamber.

33. The apparatus according to claim 32, wherein the reference cuvette contains at least one isotopomer or isotopologue of a gas species.

34. The apparatus according to claim 32, wherein at least one detector is arranged to detect electromagnetic radiation transmitted through the sample chamber and at least one reference cuvette, where at least one magnetic, electric or electromagnetic field is applied to the reference cuvette and/or sample cell and the signal processor is arranged for analysing output signals from the at least one detector to compare absorption by one or more gas species and/or one or more gas species isotopomer or isotopologue.

35. The apparatus according to claim 28, wherein the at least one field generator is configured to apply at least two different magnetic and/or electric field strengths to at least one section of the transmission path and the signal processor is configured to generate a comparison signal using output signals from the at least one detector obtained using the at least two field strengths.

36. The apparatus according to claim 28, wherein the source of electromagnetic radiation is a solid-state diode laser, whose output wavelength is tuneable by control of its temperature and/or current, and wherein the detector is a solid-state photodiode.

37. The apparatus according to claim 28, wherein the signal processor is configured to correct for the effect of optical interference by analysing first signals with and second signals without the application of magnetic, electric or electromagnetic fields.

38. The apparatus according to claim 28, wherein the at least one electromagnetic radiation source is one of a laser, a light emitting diode, an incandescent element or a flash lamp.

39. The apparatus according to claim 28, wherein the at least one detector is one of a solid-state a photodiode, a photomultiplier tube, a mercury cadmium telluride (MCT) detector, a bolometer, a pyrometer or a thermopile.

40. The apparatus according to claim 28, the apparatus further comprising an absorption spectroscopy system for use in gas detection and/or measurement, comprising:
a plurality of field generators arranged to apply at least one of an electric, magnetic or electromagnetic field to each of a plurality of sections of the absorption spectroscopy system along a transmission path of the transmitted electromagnetic radiation between the at least one source and at least one detector.

41. An absorption spectroscopy system, comprising:
a sample chamber for receiving a gas sample;
at least one electromagnetic radiation source for transmitting electromagnetic radiation along a transmission path through the sample chamber towards at least one detector;
at least one field generator arranged to apply at least one of an electric, magnetic or electromagnetic field to at least a first section of the absorption spectroscopy system that is within the transmission path of the transmitted electromagnetic radiation between the at least one source and at least one detector;
a spectroscopic measurement apparatus comprising at least one detector for monitoring absorption of electromagnetic radiation by the gas sample in the sample chamber, for at least one absorption wavelength or a wavelength range including one or more absorption wavelengths associated with a gas species, by detecting transmitted electromagnetic radiation that is not absorbed, and a signal processor for analysing an output signal from the at least one detector to measure a parameter of at least one gas species within the gas sample;
at least one polariser to polarise electromagnetic radiation within a particular plane;
wherein the at least one field generator is controllable to apply a field in each of a plurality of different applied field orientations with respect to the polarisation, for measuring a change in transmission through a gas sample of electromagnetic radiation at one or more wavelengths as a function of polarisation of an electromagnetic radiation source relative to the applied field, to determine a property of specific gas species and/or isotopologues or isotopomers of a measurand species, such as to determine pressure, temperature or concentration.

42. A method, for use in an absorption spectroscopy system, of measuring a change in transmission through a gas sample of electromagnetic radiation at one or more wavelengths, as a function of polarisation of an electromagnetic radiation source relative to the applied field, wherein the method comprises:

transmitting electromagnetic radiation from at least one source of electromagnetic radiation, along a transmission path through a gas sample in a measurement volume of an absorption spectroscopy system, towards at least one detector, and using at least one polariser to polarise the electromagnetic radiation within a particular plane;

applying at least one of an electric, magnetic or electromagnetic field to at least one section of the absorption spectroscopy system which is within the transmission path of the electromagnetic radiation that is transmitted between the at least one source and at least one detector, and controlling generation of the at least one applied field to apply a field in each of a plurality of different applied field orientations with respect to the polarisation; and measuring a change in transmission through a gas sample of electromagnetic radiation at one or more wavelengths, as a function of polarisation of the electromagnetic radiation relative to the applied field, thereby to determine a property of specific gas species and/or isotopologues or isotopomers of a measurand species, such as to determine pressure, temperature or concentration.

43. A method for gas detection and/or measurement in an absorption spectroscopy system, comprising:

transmitting electromagnetic radiation from at least one source of electromagnetic radiation, along a transmission path through a gas sample in a measurement volume of the absorption spectroscopy system, towards at least one detector;

applying at least a first one of an electric, magnetic or electromagnetic field to at least a first section of the absorption spectroscopy system which section is isolated from the measurement volume but is within the transmission path of the electromagnetic radiation that is transmitted between the at least one source and at least one detector, wherein the applied field is used to shift the quantum energy state transitions of at least one gas species within the first isolated section of the absorption spectroscopy system, thereby to suppress or modulate a spectral artefact resulting from absorption by at least one gas species within the first isolated section;

applying at least a second one of an electric, magnetic or electromagnetic field to at least a second section of the absorption spectroscopy system within the transmission path of the electromagnetic radiation, wherein the first and second fields differ from each other so as to differently modulate spectroscopic absorption by at least one gas species within the first and second sections;

using the at least one detector to monitor absorption of electromagnetic radiation, for at least one absorption wavelength or a wavelength range including one or more absorption wavelengths associated with at least one gas species, by detecting transmitted electromagnetic radiation that is not absorbed; and analysing an output signal from the at least one detector to determine the presence and/or measure a parameter of at least one gas species within the gas sample.

* * * * *